(12) United States Patent
Zhang

(10) Patent No.: US 12,309,835 B2
(45) Date of Patent: May 20, 2025

(54) METHOD AND APPARATUS FOR DETERMINING AND CONFIGURING CONTROL RESOURCE SET, AND COMMUNICATION SYSTEM

(71) Applicant: GUANGDONG OPPO MOBILE TELECOMMUNICATIONS CORP., LTD., Dongguan (CN)

(72) Inventor: Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 375 days.

(21) Appl. No.: 17/734,294

(22) Filed: May 2, 2022

(65) Prior Publication Data
US 2022/0264647 A1 Aug. 18, 2022

Related U.S. Application Data

(63) Continuation of application No. PCT/CN2019/116846, filed on Nov. 8, 2019.

(51) Int. Cl.
*H04W 74/0816* (2024.01)
*H04W 24/08* (2009.01)
(Continued)

(52) U.S. Cl.
CPC ....... *H04W 74/0816* (2013.01); *H04W 24/08* (2013.01); *H04W 72/044* (2013.01); *H04W 74/0866* (2013.01)

(58) Field of Classification Search
CPC . H04W 72/12; H04W 72/23; H04W 72/0446; H04W 72/231; H04W 72/232;
(Continued)

(56) References Cited

U.S. PATENT DOCUMENTS

2019/0141695 A1   5/2019  Babaei et al.
2019/0149286 A1   5/2019  Zhang et al.
(Continued)

FOREIGN PATENT DOCUMENTS

CN   108882376 A   11/2018
CN   109151833 A   1/2019
(Continued)

OTHER PUBLICATIONS

Notice of Allowance issued in corresponding Chinese application No. 202210170838.X, mailed Jun. 8, 2023.
(Continued)

*Primary Examiner* — Sun Jong Kim
(74) *Attorney, Agent, or Firm* — BAYES PLLC

(57) ABSTRACT

The present application relates to the technical field of communications, and disclosed are a method and apparatus for determining and configuring a control resource set, and a communication system. The method for determining the control resource set comprises: obtaining configuration information of a control resource set sent by a network device and corresponding to a BWP; determining first position information of the control resource set in a first sub-band according to the configuration information, wherein the first sub-band is at least one sub-band of a plurality of sub-bands in the BWP; and configuring the control resource set in a second sub-band according to second position information. Therefore, the control resource set can be configured in the second sub-band, so that a control resource set can also be configured in a sub-band without a control resource set configured in advance, and user equipment can also monitor the second sub-band.

25 Claims, 12 Drawing Sheets

(51) Int. Cl.
*H04W 72/044* (2023.01)
*H04W 74/08* (2024.01)

(58) Field of Classification Search
CPC ..... H04W 72/40; H04W 72/50; H04W 72/51; H04W 72/512; H04L 5/0094; H04L 5/0012; H04L 5/0082
See application file for complete search history.

(56) References Cited

U.S. PATENT DOCUMENTS

| | | | | |
|---|---|---|---|---|
| 2019/0268883 | A1* | 8/2019 | Zhang | H04L 5/0094 |
| 2021/0250923 | A1* | 8/2021 | Liu | H04W 72/20 |
| 2021/0400718 | A1* | 12/2021 | Wu | H04W 72/0453 |
| 2022/0039158 | A1* | 2/2022 | Awadin | H04W 74/0866 |
| 2022/0132473 | A1* | 4/2022 | Yang | H04L 5/00 |

FOREIGN PATENT DOCUMENTS

| | | |
|---|---|---|
| CN | 09392140 A | 2/2019 |
| CN | 109392122 A | 2/2019 |
| CN | 109511169 A | 3/2019 |
| CN | 109802755 A | 5/2019 |
| CN | 110365438 A | 10/2019 |
| EP | 4044721 B1 | 6/2023 |
| WO | 2019089125 A1 | 5/2019 |
| WO | 2019176593 A1 | 9/2019 |

OTHER PUBLICATIONS

Extended European Search Report issued in corresponding European application No. 19951661.8, mailed Sep. 14, 2022.
First Office Action issued in corresponding Indian application No. 202217026797, mailed Sep. 19, 2022.
Ericsson, "Wideband operation for NR-U", R1-1910951, 3GPP TSG-RAN WG1 Meeting #98bis Chongqing, China, Oct. 14-20, 2019.
LG Electronics, "Wide-band operation for NR-U", R1-1910823, 3GPP TSG RAN WG1 #98bis Chongqing, China, Oct. 14-20, 2019.
Huawei et al., "NRU wideband BWP operation", R1-1910049, 3GPP TSG RAN WG1 Meeting #98bis Chongqing, China, Oct. 14-20, 2019.
International Search Report issued in corresponding International Application No. PCT/CN2019/116846, mailed Aug. 3, 2020, 36 pages.
Written Opinion of the International Searching Authority issued in corresponding International Application No. PCT/CN2019/116846, mailed Aug. 3, 2020, 7 pages.
Priority Review issued in corresponding Chinese application No. 202210170838.X, mailed Mar. 27, 2023.
First Office Action issued in corresponding Chinese application No. 202210170838.X, mailed Apr. 6, 2023.
Qualcomm Incorporated, "Wideband operation for NR-U", R1-1911101, 3GPP TSG RAN WG1 Meeting #98bis Chongqing, CN Oct. 14th-Oct. 20, 2019.
Oppo, "Multiple frequency domain monitoring locations within a search space", R2-1912104, 3GPP TSG-RAN WG2 Meeting #107bis Chongqing, China, Oct. 14-Oct. 18, 2019.
First Office Action issued in corresponding Vietnamese Application No. 1-2022-03228, dated Aug. 29, 2024, 4 pages.

* cited by examiner

```
SearchSpace ::=                           SEQUENCE {
    searchSpaceId                         SearchSpaceId,
    controlResourceSetId                  ControlResourceSetId
OPTIONAL,    -- Cond SetupOnly
    multiple monitoring location                             bitmap (N-bit)
    monitoringSlotPeriodicityAndOffset    CHOICE {
        sl1                                   NULL,
        sl2                                   INTEGER (0..1),
        sl4                                   INTEGER (0..3),
        sl5                                   INTEGER (0..4),
        sl8                                   INTEGER (0..7),
        sl10                                  INTEGER (0..9),
        sl16                                  INTEGER (0..15),
        sl20                                  INTEGER (0..19),
        sl40                                  INTEGER (0..39),
        sl80                                  INTEGER (0..79),
        sl160                                 INTEGER (0..159),
        sl320                                 INTEGER (0..319),
        sl640                                 INTEGER (0..639),
        sl1280                                INTEGER (0..1279),
        sl2560                                INTEGER (0..2559)
    }
OPTIONAL,    -- Cond Setup
    duration                              INTEGER (2..2559)
OPTIONAL,    -- Need R
    monitoringSymbolsWithinSlot           BIT STRING (SIZE (14))
OPTIONAL,    -- Cond Setup
    nrofCandidates                        SEQUENCE {
        aggregationLevel1                     ENUMERATED {n0, n1, n2, n3, n4, n5, n6, n8},
        aggregationLevel2                     ENUMERATED {n0, n1, n2, n3, n4, n5, n6, n8},
        aggregationLevel4                     ENUMERATED {n0, n1, n2, n3, n4, n5, n6, n8},
        aggregationLevel8                     ENUMERATED {n0, n1, n2, n3, n4, n5, n6, n8},
        aggregationLevel16                    ENUMERATED {n0, n1, n2, n3, n4, n5, n6, n8}
    }
OPTIONAL,    -- Cond Setup
    searchSpaceType                       CHOICE {
        common                                SEQUENCE {
            dci-Format0-0-AndFormat1-0            SEQUENCE {
                ...
            }
OPTIONAL,    -- Need R
            dci-Format2-0                         SEQUENCE {
                nrofCandidates-SFI                    SEQUENCE {
                    aggregationLevel1                     ENUMERATED {n1, n2}
OPTIONAL,    -- Need R
                    aggregationLevel2                     ENUMERATED {n1, n2}
OPTIONAL,    -- Need R
                    aggregationLevel4                     ENUMERATED {n1, n2}
OPTIONAL,    -- Need R
                    aggregationLevel8                     ENUMERATED {n1, n2}
OPTIONAL,    -- Need R
                    aggregationLevel16                    ENUMERATED {n1, n2}
OPTIONAL     -- Need R
                },
                ...
            }
OPTIONAL,    -- Need R
            dci-Format2-1                         SEQUENCE {
```

FIG. 12

```
SearchSpace ::=                          SEQUENCE {
    searchSpaceId                            SearchSpaceId,
    controlResourceSetId                     ControlResourceSetId
OPTIONAL,   -- Cond SetupOnly
    multiple monitoring location                  bitmap (8-bit)
    monitoringSlotPeriodicityAndOffset       CHOICE {
        sl1                                      NULL,
        sl2                                      INTEGER (0..1),
        sl4                                      INTEGER (0..3),
        sl5                                      INTEGER (0..4),
        sl8                                      INTEGER (0..7),
        sl10                                     INTEGER (0..9),
        sl16                                     INTEGER (0..15),
        sl20                                     INTEGER (0..19),
        sl40                                     INTEGER (0..39),
        sl80                                     INTEGER (0..79),
        sl160                                    INTEGER (0..159),
        sl320                                    INTEGER (0..319),
        sl640                                    INTEGER (0..639),
        sl1280                                   INTEGER (0..1279),
        sl2560                                   INTEGER (0..2559)
    }
OPTIONAL,   -- Cond Setup
    duration                                 INTEGER (2..2559)
OPTIONAL,   -- Need R
    monitoringSymbolsWithinSlot              BIT STRING (SIZE (14))
OPTIONAL,   -- Cond Setup
    nrofCandidates                           SEQUENCE {
        aggregationLevel1                        ENUMERATED {n0, n1, n2, n3, n4, n5, n6, n8},
        aggregationLevel2                        ENUMERATED {n0, n1, n2, n3, n4, n5, n6, n8},
        aggregationLevel4                        ENUMERATED {n0, n1, n2, n3, n4, n5, n6, n8},
        aggregationLevel8                        ENUMERATED {n0, n1, n2, n3, n4, n5, n6, n8},
        aggregationLevel16                       ENUMERATED {n0, n1, n2, n3, n4, n5, n6, n8}
    }
OPTIONAL,   -- Cond Setup
    searchSpaceType                          CHOICE {
        common                                   SEQUENCE {
            dci-Format0-0-AndFormat1-0               SEQUENCE {
                ...
            }
OPTIONAL,   -- Need R
            dci-Format2-0                        SEQUENCE {
                nrofCandidates-SFI                   SEQUENCE {
                    aggregationLevel1                    ENUMERATED {n1, n2}
OPTIONAL,   -- Need R
                    aggregationLevel2                    ENUMERATED {n1, n2}
OPTIONAL,   -- Need R
                    aggregationLevel4                    ENUMERATED {n1, n2}
OPTIONAL,   -- Need R
                    aggregationLevel8                    ENUMERATED {n1, n2}
OPTIONAL,   -- Need R
                    aggregationLevel16                   ENUMERATED {n1, n2}
OPTIONAL,   -- Need R
                },
                ...
            }
OPTIONAL,   -- Need R
            dci-Format2-1                        SEQUENCE {
```

FIG. 13

METHOD AND APPARATUS FOR DETERMINING AND CONFIGURING CONTROL RESOURCE SET, AND COMMUNICATION SYSTEM

CROSS-REFERENCE TO RELATED APPLICATION

This application is a continuation of International Application No. PCT/CN2019/116846, filed Nov. 8, 2019, the contents of which are incorporated herein by reference in its entirety.

TECHNICAL FIELD

The present application relates to the technical field of communication, and more specifically, to a method, apparatus, and communication system for determining and configuring a control resource set.

BACKGROUND

In the 5G system, in order to ensure the friendly coexistence of various communication systems that use unlicensed spectrum for wireless communication, communication devices follow the principle of "listen before talk (LBT)", that is, before sending signals on channels of the unlicensed spectrum, the communication device needs to perform channel detection first, and only when the channel detection result is that the channel is idle, the communication device can send the signals. However, the communication device will only detect on channels that are pre-configured with a control resource set (CORESET), and how to detect other channels that are not pre-configured with a CORESET, there is currently no effective solution.

SUMMARY

The present application proposes a method, apparatus and communication system for determining and configuring a control resource set.

In a first aspect, the embodiments of the present application provide a method for determining a control resource set, which is applied to a user equipment of a communication system, the communication system further includes a network device, and the method includes: acquiring configuration information of a control resource set corresponding to a BWP sent by a network device; determining first location information of the control resource set in a first sub-band according to the configuration information, where the first sub-band is at least one sub-band in a plurality of sub-bands in the BWP; determining second location information of the control resource set in a second sub-band according to the first location information, where the second sub-band is a sub-band in the plurality of sub-bands except the first sub-band; and configuring the control resource set in the second sub-band according to the second location information.

In a second aspect, the embodiments of the present application also provide a method for configuring a control resource set, which is applied to a network device of a communication system, the communication system further includes a user equipment, and the method includes: configuring a BWP and a plurality of sub-bands corresponding to the BWP for the user equipment; configuring a control resource set at first location information in a first sub-band of the BWP to acquire configuration information of the control resource set, where the first sub-band is at least one sub-band in the plurality of sub-bands in the BWP; determining second location information of the control resource set in a second sub-band according to the first location information, where the second sub-band is a sub-band in the plurality of sub-bands except the first sub-band; and sending the configuration information of the control resource set to the user equipment, to instruct the user equipment to monitor the second sub-band according to the control resource set determined above.

In a third aspect, the embodiments of the present application also provide an apparatus for determining a control resource set, which is applied to a user equipment of a communication system, the communication system further includes a network device, and the apparatus includes: a first determination unit, an acquiring unit, a second determination unit and a configuration unit. The first determination unit is configured to acquire configuration information of a control resource set corresponding to a BWP sent by the network device. The acquiring unit is configured to determine first location information of the control resource set in a first sub-band according to the configuration information, where the first sub-band is at least one sub-band in a plurality of sub-bands in the BWP. The second determination unit is configured to determine second location information of the control resource set in a second sub-band according to the first location information, where the second sub-band is a sub-band in the plurality of sub-bands except the first sub-band. The configuration unit is configured to configure the control resource set in the second sub-band according to the second location information.

In a fourth aspect, the embodiments of the present application also provide an apparatus for configuring a control resource set, which is applied to a network device of a communication system, the communication system further includes a user equipment, and the apparatus includes: a first configuration unit, a second configuration unit, a determination unit and a sending unit. The first configuration unit is configured to configure a BWP and a plurality of sub-bands corresponding to the BWP for the user equipment. The second configuration unit is configured to configure a control resource set at first location information in a first sub-band of the BWP to acquire configuration information of the control resource set, where the first sub-band is at least one sub-band in the plurality of sub-bands in the BWP. The determination unit is configured to determine second location information of the control resource set in a second sub-band according to the first location information, where the second sub-band is a sub-band in the plurality of sub-bands except the first sub-band. The sending unit is configured to send the configuration information of the control resource set to the user equipment, to instruct the user equipment to monitor the second sub-band according to the method according to any one of claims 1-17.

In a fifth aspect, the embodiments of the present application also provide a user equipment, which is applied to a communication system, the communication system further includes a network device, and the user equipment includes: one or more processors; a memory; and one or more application programs, where the one or more application programs are stored in the memory and configured to be executed by the one or more processors, and the one or more programs are configured to execute the above-mentioned method for determining a control resource set.

In a sixth aspect, the embodiments of the present application also provide a network device, which is applied to a communication system, the communication system further includes a user equipment, and the network device includes: one or more processors; a memory; and one or more application programs, where the one or more application programs are stored in the memory and configured to be executed by the one or more processors, and the one or more programs are configured to execute the above-mentioned method for configuring a control resource set.

In a seventh aspect, the embodiments of the present application also provide a communication system, including: a user equipment and a network device, and the user equipment is connected to the network device. The network device is configured to configure a BWP and a plurality of sub-bands corresponding to the BWP for the user equipment, configure a control resource set at first location information in a first sub-band of the BWP to acquire configuration information of the control resource set, and determine second location information of the control resource set in a second sub-band according to the first location information, where the first sub-band is at least one sub-band in a plurality of sub-bands in the BWP, and the second sub-band is a sub-band in the plurality of sub-bands except the first sub-band. The user equipment is configured to acquire the configuration information of the control resource set corresponding to the BWP sent by the network equipment, determine the first location information according to the configuration information, determine the second location information according to the first location information, and monitor the control resource set at the second location information in the second sub-band.

In an eighth aspect, the embodiments of the present application also provide a computer-readable medium that stores a program code executable by a processor, and when the program code is executed by the processor, the processor performs the above-mentioned method for determining a control resource set.

In a ninth aspect, the embodiments of the present application also provide a computer-readable medium that stores a program code executable by a processor, and when the program code is executed by the processor, the processor performs the above-mentioned method for configuring a control resource set.

The method, apparatus, and communication system for determining and configuring a control resource set provided in the present application can not only detect the sub-bands pre-configured with the control resource set in the BWP, but also detect other sub-bands in the BWP. Specifically, the sub-band configured with the control resource set among the plurality of sub-bands in the BWP is determined firstly, which can be recorded as the first sub-band, and then the first location information of the control resource set in the first sub-band is acquired. Then, the second location information of the control resource set in the second sub-band is determined according to the first location information, where the second sub-band is a sub-band among the plurality of sub-bands except the first sub-band, i.e., no control resource set is pre-configured in the second sub-band. Finally, according to the second location information, the control resource set is configured in the second sub-band. In this way, the control resource set can be configured in the second sub-band, so that the sub-band that has not been previously configured with the control resource set can also be configured with the control resource set, and thus the user equipment can also detect the second sub-band.

BRIEF DESCRIPTION OF THE DRAWINGS

In order to more clearly describe the technical solutions in the embodiments of the present application, the following will briefly introduce the drawings that need to be used in the description of the embodiments. Obviously, the drawings in the following description show only some embodiments of the present application. For those of ordinary skill in the art, other drawings can be obtained based on these drawings without creative labor.

FIG. 12 shows a schematic diagram of codes corresponding to multiple monitoring location according to an embodiment of the present application;

FIG. 13 shows a schematic diagram of codes corresponding to multiple monitoring location according to another embodiment of the present application;

DETAILED DESCRIPTION

Figure 1:
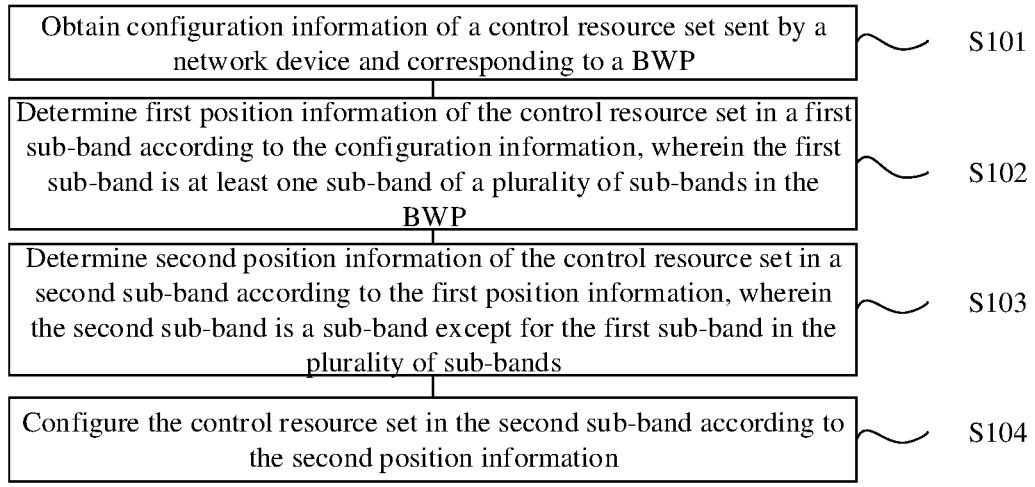
FIG. 1 shows a flowchart of a method for determining a control resource set according to an embodiment of the present application.

In order to enable those skilled in the art to better understand the solutions of the present application, the technical solutions in the embodiments of the present application will be described clearly and completely in conjunction with the accompanying drawings in the embodiments of the present application.

The method, apparatus, electronic device, and readable medium for configuring and controlling a resource set provided by the present disclosure can be applied to various communication systems, for example, 5th Generation (5G) communication systems (or called New Radio (NR) System), future evolution system or multiple communication fusion systems, etc., and can include a variety of application scenarios, such as machine to machine (M2M), D2M, macro and micro communications, enhance mobile broadband (eMBB), ultra reliable & low latency communication (uRLLC) and massive machine type communication (mMTC). These scenarios include, but are not limited to: a communication between a terminal and a terminal, or a communication between a network device and a network device, or a communication between a network device and a terminal, and other scenarios.

NR-U (the full name is NR in Unlicensed Spectrum) is an NR system that works on an unlicensed spectrum. In 5G communication systems, unlicensed bands can be used as a supplement to licensed bands to help operators expand services. In order to be consistent with NR deployment and maximize NR-based unlicensed access, the unlicensed bands can work in 5 GHz, 37 GHz and 60 GHz frequency bands. The large bandwidth (80 MHz or 100 MHz) of the unlicensed band can reduce the implementation complexity of the network device and the terminal. Since the unlicensed band is a shared spectrum, and shared by a plurality of radio access technologies (Radio Access Technology, RATs), such as WiFi, radar, and Long Term Evolution License Assisted Access (LTE-LAA), etc., the communication devices in different communication systems can use the spectrum as long as they meet the regulatory requirements set by the country or region on the spectrum, and there is no need to apply for a proprietary spectrum authorization from the government.

In order to allow various communication systems that use the unlicensed spectrum for wireless communication to coexist friendly on the spectrum, in some countries or regions, the unlicensed bands should comply with certain regulations when being used, so as to ensure that all devices can use this resource fairly. For example, the communication device follows the Listen Before Talk (LBT) principle, that is, the communication device needs to perform channel detection before sending signals on the channel of the unlicensed spectrum, and only when the channel listening result is that the channel is idle, the communication device can send signals; and if the channel detection result of the communication device on the channel of the unlicensed spectrum is that the channel is busy, the communication device cannot send signals. In order to ensure fairness, in one transmission, the duration that the communication device uses the unlicensed spectrum channel for signal transmission cannot exceed the Maximum Channel Occupancy Time (MCOT).

In the 5G communication system, a large bandwidth (for example, greater than or equal to 100 MHz) is usually used to transmit data. Since the communication devices have different bandwidth capabilities, in order to enable the communication devices with small bandwidth capabilities to access part of the bandwidth in the large bandwidth network, the concept of bandwidth part (BWP) is introduced in the NR system.

In NR, the bandwidth of the UE can be dynamically changed. For example, at the first moment, the UE has a large traffic volume, then the system configures a large bandwidth (BWP1) for the UE; at the second moment, the UE has a small traffic volume, then the system configures a small bandwidth (BWP2) for the UE to meet the basic requirements; at the third moment, the system finds that there is a wide range of frequency selective fading in the bandwidth where BWP1 is located, or that resources in the frequency range where BWP1 is located are relatively scarce, then a new bandwidth (BWP3) is configured for the UE.

In the wideband NR-U mode (wideband), one activated BWP may include a plurality of sub-bands. The communication device adopts the LBT principle to access in the sub-bands, and then the sub-band may also be called an LBT sub-band.

Before the communication device accesses a certain sub-band, it needs to detect whether the sub-band meets the LBT principle, that is, whether it is in an idle state. Only when the sub-band is in the idle state, the communication device can use the sub-band for signal transmission. Specifically, the communication device needs to search for the Control Resource Set (CORESET) in the sub-band to obtain the Downlink Control Information (DCI) carried on the Physical Downlink Control Channel (PDCCH), and then it can detect the sub-band. Specifically, the PDCCH carries Downlink Control Information (DCI), which contains the resource allocation and other control information of one or more user equipments. That is to say, in the NR system, the UE needs to know the location in the frequency domain and the location in the time domain of the PDCCH, and then the PDCCH can be successfully decoded. For convenience, the NR system encapsulates information, such as the frequency band occupied by the PDCCH in the frequency domain and the number of OFDM symbols occupied by the PDCCH in the time domain, in the CORESET.

However, since the number of CORESETs that can be configured in one BWP is limited, for example, the maximum number of CORESETs that can be configured is 3, there may be no CORESETs configured in some sub-bands. After detecting the sub-band(s) that is pre-configured with CORESET, if the communication device determines that there is no sub-band in the idle state, the communication device cannot use this sub-band(s) to send data.

In addition, because the communication device cannot detect the sub-band(s) that is not configured with CORESET, the communication device is unable to use such sub-band(s) to send data, either.

Therefore, in order to improve the foregoing shortcomings, the embodiment of the present application provides a method for determining a control resource set. In the embodiment of the present application, the method can be applied to the aforementioned communication system, for example, it may be an NR R15 system. The communication system includes a communication device and a network device. As an implementation manner, the communication device may be a wireless terminal, and the wireless terminal may be a mobile device, a user equipment (UE), an access terminal, a wireless communication device, a terminal unit, a terminal station, a Mobile Station, a Mobile, a remote station, a faraway station, a remote terminal (RemoteTerminal), a Subscriber Unit, a Subscriber Station, a user agent (UserAgent), a terminal apparatus, etc. As an implementation manner, the network device may be a base station, a core network device, a transmission reference point (TRP), a relay station, or an access point.

In the embodiment of the present application, the network device is a base station, and the communication device may be a UE, that is, the execution subject of the method for configuring a control resource set may be the UE. As shown in FIG. 1, the method includes: S101 to S104.

In S101, configuration information of a control resource set corresponding to a BWP sent by a network device is acquired.

The UE may be configured with one or more BWPs by the network device, and when the UE is configured with a plurality of BWPs, each BWP may adopt the same or different numerical configuration (numerology).

The embodiment of the present application is mainly applied in a scenario where the base station configures one BWP for the UE. Specifically, in the NRU mode, after the base station configures one activated BWP for the UE, the base station may also configure at least one sub-band for the BWP. It should be noted that since the UE uses the LBT principle to access the sub-band, the sub-band may also be referred to as the LBT sub-band, that is, the sub-band in the BWP appearing in the embodiments of the present application may be understood as the LBT sub-band.

In the embodiment of the present application, the base station configures a plurality of sub-bands for the BWP, and the number of sub-bands is denoted as M.

In addition, the base station also needs to configure at least one Control Resource Set (CORESET) in the BWP, and then the base station informs the UE of such configuration information, so that the UE can determine the sub-band(s) configured with the control resource set(s) in the plurality of sub-bands in the BWP, and can denote it(them) as the first sub-band(s).

In addition, the number of CORESETs configured by the base station for the BWP is limited. For example, the maximum number of CORESETs that can be configured is three. Therefore, the number of CORESETs configured by the base station for the BWP may be one or more, but should not exceed the maximum number of CORESETs that can be configured. When the number of CORESETs is multiple, the plurality of sub-bands configured with the control resource sets among the plurality of sub-bands in the BWP are collectively referred to as the first sub-band. When the number of CORESET is one, the first sub-band is also one sub-band.

As an implementation manner, in order to enable the UE to monitor the offset CORESET in other sub-bands, the frequency domain resource of the CORESET configured by the base station for the UE is completely included in any one of the plurality of sub-bands, that is, the frequency domain resource of the CORESET may not span the plurality of sub-bands.

In addition, the number of sub-bands included in the BWP is two or more, so that the plurality of sub-bands in the BWP include sub-bands configured with CORESET by the base station and sub-bands not configured with CORESET by the base station.

In S102, first location information of the control resource set in a first sub-band is determined according to the configuration information, where the first sub-band is at least one sub-band among the plurality of sub-bands in the BWP.

When the base station configures the BWP for the UE and configures CORESET for the BWP, it may send the configuration information of the CORESET to the UE, and the UE can determine the location information of the CORESET according to the configuration information, that is, the first location information of the CORESET in the first sub-band.

In S103, second location information of the control resource set in a second sub-band is determined according to the first location information, where the second sub-band is a sub-band in the plurality of sub-bands except the first sub-band.

The second sub-band is a sub-band that needs to be monitored by the UE for CORESET. In the embodiment of the present application, the plurality of sub-bands corresponding to the BWP include the first sub-band configured with CORESET by the base station and other sub-bands, and the sub-band that needs to be configured with CORESET by the UE can be determined from the above-mentioned other sub-bands, that is, the second sub-band is determined from other sub-bands, and the specific determination method can refer to the subsequent embodiments. In the same way, the second sub-band may be a collective term for a plurality of sub-bands that are not configured with CORESETs by the base station, or may be another name for one sub-band that is not configured with CORESET by the base station, specifically, it depends on the number of sub-bands that need to be monitored by the UE for CORESET.

After determining the sub-band that needs to be monitored by the UE for the CORESET, that is, after determining the second sub-band, the second location information of the CORESET in the second sub-band is determined according to the first location information of the CORESET in the first sub-band. As an implementation manner, a location offset rule is preset, and the second location information is determined according to the location offset rule and the first location information.

In some embodiments, the location offset rule may be that the relative location of CORESET in the first sub-band is consistent with the relative location of the CORESET in the second sub-band, where the relative location may be a location of a reference point location of the CORESET in the sub-band relative to an index of the sub-band. The reference point location may be the first PRB location of CORESET in the sub-band, or may be the last PRB location or other locations, and specific implementation manners will be introduced in subsequent implementations.

In S104, the control resource set is monitored at the second location information in the second sub-band.

After the UE determines the second location information of the CORESET in the second sub-band, the UE can monitor the CORESET at the second location information of the second sub-band, so as to monitor the CORESET on the second sub-band.

In the embodiment of the present application, the CORESET configured by the base station for the UE is named the reference CORESET, and then the CORESET in the first sub-band is the reference CORESET. The CORESET in the second sub-band is named offset CORESET, that is, the offset CORESET is the CORESET determined in the second sub-band after the UE shifts (offsets) according to the reference CORESET in the first sub-band.

After the base station configures the first location information of CORESET in the first sub-band, it may also determine the second location information of CORESET in the second sub-band according to the first location information, that is, determine the location information of the offset CORESET, and the manner in which the base station determines the second location information of the offset CORESET is the same as the manner in which the UE determines the second location information of the offset CORESET. Therefore, when the UE monitors in the second sub-band according to the location information of the determined offset CORESET, the base station can determine the location where the UE is listening in the second sub-band, thereby realizing the detection of the second sub-band by the UE.

Then, the UE can detect the first sub-band based on the reference CORESET and the second sub-band based on the offset CORESET, thereby avoiding that the UE can only detect the sub-band pre-configured with CORESET by the base station and cannot detect other sub-band(s).

Figure 2:
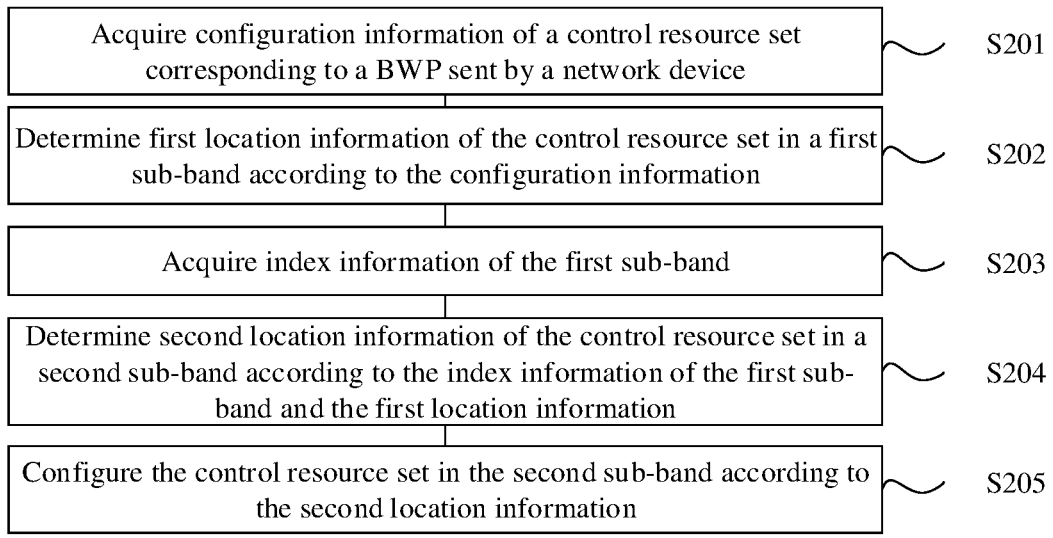
FIG. 2 shows a flowchart of a method for determining a control resource set according to another embodiment of the present application.

Referring to FIG. 2, another embodiment of the present application provides a method for determining a control resource set. The execution subject of the method may be a UE, and the method includes: S201 to S205.

In S201, configuration information of a control resource set corresponding to the BWP sent by a network device is acquired.

In S202, first location information of the control resource set in a first sub-band is determined according to the configuration information.

In S203, index information of the first sub-band is acquired.

The index information may be one reference location point in the first sub-band, and a relative location of CORESET relative to the reference location point in the first sub-band can be determined according to the reference location point, so that the location(s) of CORESET in other sub-band(s) can be determined according to the relative location information in subsequent steps.

As an implementation manner, the index information includes at least one of a starting PRB location, a starting available PRB location, and a guard band ending PRB location. In the implementation of this application, the index information is the starting PRB location, the starting available PRB location, or the guard band ending PRB location, and when the index information is the above-mentioned different locations, the methods of determining the location(s) of CORESET in other sub-band(s) are also different. For details, the subsequent embodiments may be referred to.

Resource Block (RB) is a resource block. Specifically, 12 consecutive subcarriers in the frequency domain and one slot in the time domain are called 1 RB, where the subcarrier is a basic unit in the frequency domain. All resources available in the frequency domain are called bandwidth, and the unit thereof is RB. Each RB contains 12 subcarriers.

RB has two concepts: virtual resource block (Virtual RB, VRB) and physical resource block (Physical RB, PRB). When the mac layer allocates resources, the allocation is performed according to VRB, and then VRB is mapped to PRB. There are also two ways to map VRB to PRB: distributed and centralized. In the centralized mapping way, VRB and PRB have a one-to-one correspondence. In the distributed mapping way, before mapping to PRB, VRB needs to be interleaved first, and then is mapped to the actual PRB location according to a certain rule. Therefore, after the resource allocation ends, the sub-band is composed of a plurality of PRBs.

In S204, second location information of the control resource set in a second sub-band is determined according to the index information of the first sub-band and the first location information.

Then, after the relative location of CORESET relative to the index information in the first sub-band can be determined according to the index information of the first sub-band, the second location information of the control resource set in the second sub-band can be determined according to the above-mentioned location offset rule. For details, the subsequent embodiments may be referred to.

In the subsequent embodiments, the depiction is given about how to determine the second location information of CORESET in the second sub-band under the condition that the index information is the starting PRB location, the starting available PRB location, and the guard band ending PRB location, respectively. In S205, the control resource set is monitored at the second location information in the second sub-band.

It should be noted that, for the parts that are not described in detail in the foregoing steps, the foregoing embodiments may be referred to, and will not be repeated here.

Figure 3:
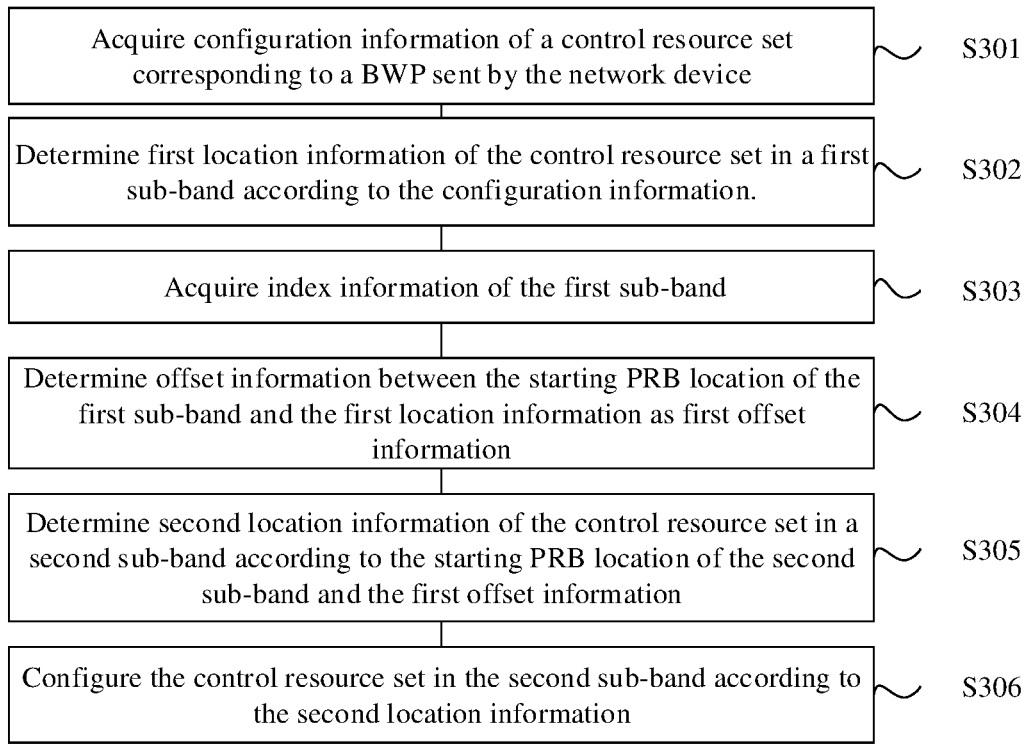
FIG. 3 shows a flowchart of a method for determining a control resource set according to another embodiment of the present application.

Referring to FIG. 3, another embodiment of the present application provides a method for determining a control resource set. The execution subject of the method may be a UE. In the method, the index information of the first sub-band is the starting PRB location of the first sub-band, and the method includes: S301 to S306.

In S301, configuration information of a control resource set corresponding to the BWP sent by the network device is acquired.

In S302, first location information of the control resource set in a first sub-band is determined according to the configuration information.

In S303, index information of the first sub-band is acquired.

Figure 4:
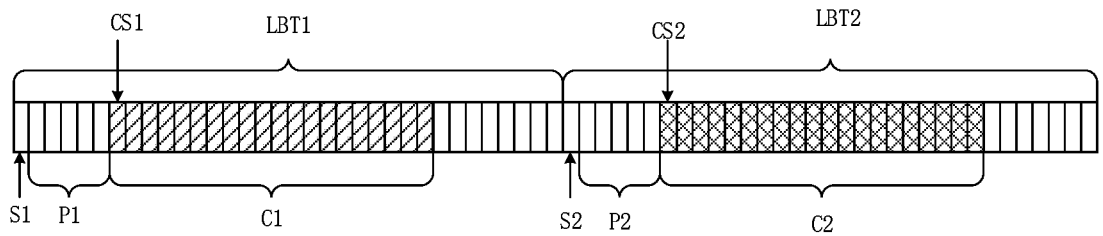
FIG. 4 shows a schematic diagram of locations of a reference CORESET and an offset CORESET according to an embodiment of the present application.

The index information of the first sub-band is the starting PRB location of the first sub-band. As shown in FIG. 4, LBT1 represents the first sub-band, S1 represents the starting PRB location of the first sub-band, and each square in FIG. 4 corresponds to one PRB.

In the embodiment of the present application, the CORESET in the first sub-band is named the reference CORESET.

In S304, offset information between the starting PRB location of the first sub-band and the first location information is determined as first offset information.

In the embodiment of the present application, the offset information may indicate a relative location or a relative distance between a reference point location of the reference CORESET in the first sub-band and the starting PRB location of the first sub-band. As an implementation manner, the offset information may indicate the number of PRBs between the reference point location of the reference CORESET in the first sub-band and the starting PRB location of the first sub-band.

As an implementation manner, the aforementioned reference point location may be the starting PRB location of the reference CORESET in the first sub-band, that is, the first location information is the starting PRB location of the reference CORESET in the first sub-band. As shown in FIG.

4, C1 is the first location information of the reference CORESET in the first sub-band, and C1 occupies a plurality of PRBs. As shown in FIG. 4, C1 corresponds to 20 PRBs, that is, in FIG. 4, the PRBs in an area filled with diagonal lines correspond to the location of the reference CORESET in the first sub-band. The starting PRB location of the reference CORESET in the first sub-band may be a location corresponding to the PRB closest to the starting PRB location of the first sub-band among the plurality of PRBs occupied by the reference CORESET in the first sub-band. As shown in FIG. 4, the leftmost PRB of C1 is the starting PRB location of the reference CORESET in the first sub-band, that is, CS1 in FIG. 4 is the starting PRB location of the reference CORESET in the first sub-band.

That is, the starting PRB location of the CORESET in the corresponding sub-band may be a location corresponding to the PRB closest to the starting PRB location of the sub-band among all PRBs corresponding to the corresponding sub-band of the CORESET.

Then the first offset information is the offset information between the starting PRB location of the reference CORESET in the first sub-band and the starting PRB location of the first sub-band. Specifically, the offset information may be an offset between the starting PRB location of CORESET in the first sub-band and the starting PRB location of the first sub-band. As shown in FIG. 4, P1 represents the offset between the starting PRB location S1 of the first sub-band and CS1, and the offset can be represented by the number of PRBs. As shown in FIG. 4, the offset represented by P1 is 5 PRBs.

In S305, second location information of the control resource set in a second sub-band is determined according to the starting PRB location of the second sub-band and the first offset information.

In the embodiment of the present application, the second sub-band also includes a reference location point.

For example, the reference location point may also be the starting PRB location of the second sub-band. According to the starting PRB location of the second sub-band and the first offset information, the offset information of CORESET relative to the starting PRB location of the second sub-band in the second sub-band can be determined.

As an implementation manner, the CORESET configured in the second sub-band is named offset CORESET. The offset information of the offset CORESET in the second sub-band may be named second offset information, and the second offset information may be offset information between the starting PRB location of the CORESET in the second sub-band and the starting PRB location of the second sub-band. As an implementation manner, the second offset information may be the offset between the starting PRB location of CORESET in the second sub-band and the starting PRB location of the second sub-band, that is, the number of PRBs. Then the first offset information and the second offset information may be the same, or may be changed regularly.

For example, the second sub-band is a general term for a plurality of sub-bands for which CORESET is not set by the base station, and in the plurality of sub-bands, the number of PRBs between the starting PRB location of CORESET and the starting PRB location of the sub-band changes regularly, for example, changes in the form of an arithmetic sequence of 4 PRBs, 5 PRBs, 6 PRBs, etc.

In the embodiment of the present application, the first offset information and the second offset information are the same, that is, in all sub-bands that need to be detected by the UE, the numbers of PRBs between the starting PRB locations of CORESET and the starting PRB locations of the sub-bands are the same.

As shown in FIG. 4, P1 represents the first offset information, P2 represents the second offset information, S1 is the starting PRB location of the first sub-band, S2 is the starting PRB location of the second sub-band, CS1 is the starting PRB location of the reference CORESET, and CS2 is the starting PRB location of the offset CORESET, then the number of PRBs corresponding to P1 and the number of PRBs corresponding to P2.

That is, the relative location of the offset CORESET in its corresponding LBT2 and the relative location of the reference CORESET in its corresponding LBT1 remain unchanged. And the number of PRBs between the first PRB location of the offset CORESET in the frequency domain and the first PRB location of LBT2 where it is located, and the number of PRBs between the first PRB location of the reference CORESET in the frequency domain and the first PRB location of LBT1 where it is located, are the same.

In S306, the control resource set is monitored at the second location information in the second sub-band.

As an implementation manner, the frequency domain resource size of the control resource set in the first sub-band is the same as the frequency domain resource size of the control resource set in the second sub-band, that is, the sizes of the frequency domain resources of the reference CORESET and the offset CORESET are the same. As shown in FIG. 4, LBT2 represents the second sub-band, and then C2 represents the location of the offset CORESET in LBT2, that is, in FIG. 4, the PRBs in the area filled with grid lines correspond to the location of the offset CORESET in the second sub-band, the number of PRBs corresponding to C2 represents the frequency domain resource size of the offset CORESET, C1 represents the location of the reference CORESET in LBT1, and the number of PRBs corresponding to C1 represents the frequency domain resource size of the reference CORESET. It can be seen that the number of PRBs corresponding to C2 is 20, and the number of PRBs corresponding to C1 is also 20, that is, the frequency domain resource sizes of the reference CORESET and the offset CORESET are the same.

Figure 5:
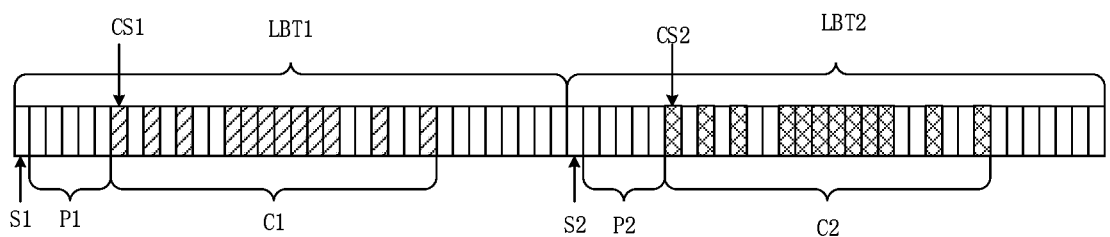
FIG. 5 shows a schematic diagram of the locations of the reference CORESET and the offset CORESET according to another embodiment of the present application.

In addition, as shown in FIG. 4, the plurality of PRBs corresponding to the reference CORESET and the offset CORESET are all continuous, and in other embodiments, the plurality of PRBs corresponding to the reference CORESET and the offset CORESET may also be discontinuous. As shown in FIG. 5, the PRBs in the area filled with diagonal lines correspond to the location of the reference CORESET in the first sub-band, and the PRBs in the area filled with grid lines correspond to the location of the offset CORESET in the second sub-band. It can be seen that the plurality of PRBs corresponding to the reference CORESET and the offset CORESET are not continuous, and the number of PRBs corresponding to the reference CORESET and the number of PRBs corresponding to the offset CORESET are the same.

Furthermore, the frequency domain resource size of the control resource set in the first sub-band is the same as the frequency domain resource size of the control resource set in the second sub-band, which can also be understood as that the number of PRBs corresponding to the reference CORESET and the number of PRBs corresponding to the offset CORESET are the same. In the first sub-band, the plurality of PRBs corresponding to the reference CORESET include the starting PRB and a plurality of other PRBs. Similarly, in the second sub-band, the plurality of PRBs corresponding to the offset CORESET also include the starting PRB and a plurality of other PRBs. Then the distance between each PRB in the plurality of other PRBs and the starting PRB in the first sub-band is correspondingly the same as the distance between each PRB in the plurality of other PRBs and the starting PRB in the second sub-band. Specifically, taking the first sub-band as an example, the location distribution of the plurality of PRBs corresponding to the reference CORESET may be regarded as a sequence, then the first element in the sequence is the starting PRB of the reference CORESET, and in the plurality of other PRBs, the PRB closest to the starting PRB is taken as the second element of the sequence, and so on, and the ending PRB of the reference CORESET is taken as the last element of the sequence. In the same way, the offset CORESET also corresponds to a sequence, and the location distribution method is the same as that of the sequence of the reference CORESET.

The number of PRBs between the $i^{th}$ element and the first element in the sequence corresponding to the reference CORESET and the number of PRBs between the $i^{th}$ element and the first element in the sequence corresponding to the offset CORESET are the same, where i is a positive integer, the minimum value of i is 1, and the maximum value of i is consistent with the number of PRBs corresponding to CORESET. As shown in FIG. 5, the number of PRBs between CS1 and the fourth PRB (that is, the third square filled with diagonal lines on the right side of CS1) in C1 is 6, and the number of PRBs between CS2 and the fourth PRB (that is, the third square filled with the grid line on the right side of CS2) in C2 is also 6. It should be noted that, for the parts that are not described in detail in the foregoing steps, the foregoing embodiments may be referred to, and will not be repeated here.

Figure 6:
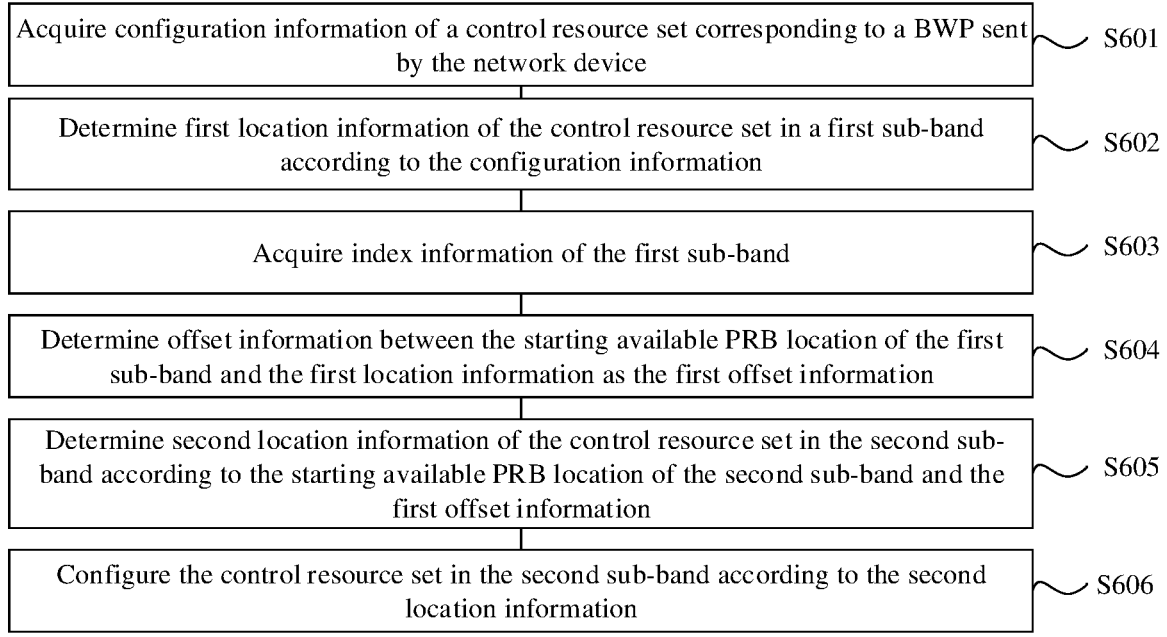
FIG. 6 shows a flowchart of a method for determining a control resource set according to still another embodiment of the present application.

Referring to FIG. 6, another embodiment of the present application provides a method for determining a control resource set. The execution subject of the method may be a UE. In the method, the index information of the first sub-band is the starting available PRB location of the first sub-band, and the method includes: S601 to S606.

In S601, configuration information of a control resource set corresponding to a BWP sent by the network device is acquired.

In S602, first location information of the control resource set in a first sub-band is determined according to the configuration information.

In S603, index information of the first sub-band is acquired.

Figure 7:
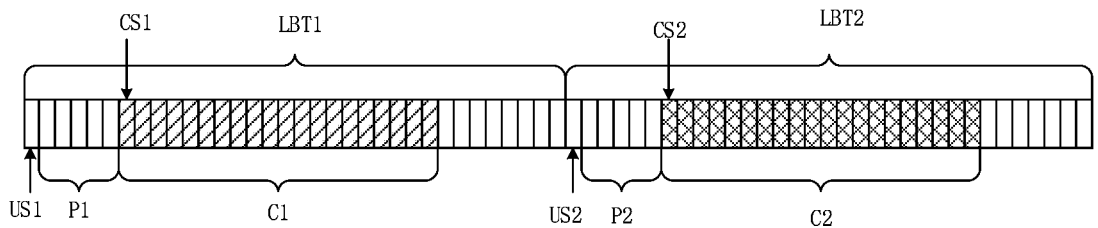
FIG. 7 shows a schematic diagram of the locations of the reference CORESET and the offset CORESET according to another embodiment of the present application.

The index information of the first sub-band is the starting available PRB location of the first sub-band. As shown in FIG. 7, LBT1 indicates the first sub-band, US1 indicates the starting available PRB location of the first sub-band, and similar to FIGS. 4 and 5, each square in FIG. 7 also corresponds to one PRB.

The starting available PRB is a location corresponding to the first PRB among all available PRBs in the sub-band. Specifically, the UE may learn the location of the starting available PRB through the base station.

In the embodiment of the present application, the CORESET in the first sub-band may also be named as a reference CORESET.

In S604, offset information between the starting available PRB location of the first sub-band and the first location information is determined as the first offset information.

In the embodiment of the present application, the offset information may indicate a relative location or a relative distance between the reference point location of the reference CORESET in the first sub-band and the starting available PRB location of the first sub-band. As an implementation manner, the offset information may indicate the number of PRBs between the reference point location of the reference CORESET in the first sub-band and the starting available PRB location of the first sub-band.

As an implementation manner, the aforementioned reference point location may be the starting PRB location of the reference CORESET in the first sub-band, that is, the first location information is the starting PRB location of the reference CORESET in the first sub-band. As shown in FIG. 7, C1 is the first location information of the reference CORESET in the first sub-band, then C1 occupies a plurality of PRBs. As shown in FIG. 7, C1 corresponds to 20 PRBs, that is, in FIG. 7, the PRBs in the area filled with diagonal lines correspond to the location of the reference CORESET in the first sub-band. The starting PRB location of the reference CORESET in the first sub-band may be the location corresponding to the PRB closest to the starting available PRB location of the first sub-band among the plurality of PRBs occupied by the reference CORESET in the first sub-band. As shown in FIG. 7, the leftmost PRB of C1 is the starting PRB location of the reference CORESET in the first sub-band, that is, CS1 in FIG. 7 is the starting PRB location of the reference CORESET in the first sub-band.

That is to say, the starting PRB location of CORESET in the corresponding sub-band may be the location corresponding to the PRB closest to the starting available PRB location of the sub-band among all PRBs corresponding to the CORESET in the corresponding sub-band.

Then the first offset information is the offset information between the starting PRB location of the reference CORESET in the first sub-band and the starting available PRB location of the first sub-band. Specifically, the offset information may be the offset between the starting PRB location of the reference CORESET in the first sub-band and the starting available PRB location of the first sub-band. As shown in FIG. 7, P1 represents the offset between the starting available PRB location US1 of the first sub-band and CS1, and then the offset may be represented by the number of PRBs. As shown in FIG. 7, the offset represented by P1 is 5 PRBs.

In S605, second location information of the control resource set in a second sub-band is determined according to the starting available PRB location of the second sub-band and the first offset information.

In the embodiment of the present application, the second sub-band also includes one reference location point. For example, the reference location point may also be the starting available PRB location of the second sub-band. According to the starting available PRB location of the second sub-band and the first offset information, the offset information of CORESET relative to the starting available PRB location of the second sub-band in the second sub-band may be determined.

As an implementation manner, the CORESET configured in the second sub-band is named offset CORESET. The offset information of the offset CORESET in the second sub-band may be named second offset information, and then the second offset information may be the offset information between the starting PRB location of CORESET in the second sub-band and the starting available PRB location of the second sub-band. As an implementation manner, the second offset information may be the offset between the starting PRB location of CORESET in the second sub-band and the starting available PRB location of the second sub-band, that is, the number of PRBs. Then the first offset information and the second offset information may be the same, or may be changed regularly.

For example, the second sub-band is a collective term for a plurality of sub-bands for which CORESET is not set by the base station. In the plurality of sub-bands, the number of PRBs between the starting PRB location of CORESET and the starting available PRB location of the sub-band changes regularly, for example, changes in the form of an arithmetic sequence of 4 PRBs, 5 PRBs, 6 PRBs, etc.

In the embodiment of the present application, the first offset information and the second offset information are the same, that is, in all sub-bands that need to be detected by the UE, the numbers of PRBs between the starting PRB location of CORESET and the starting available PRB location of the sub-band are the same.

As shown in FIG. 7, P1 represents the first offset information, P2 represents the second offset information, US1 is the starting available PRB location of the first sub-band, US2 is the starting available PRB location of the second sub-band, CS1 is the starting PRB location of the reference CORESET, and CS2 is the starting PRB location of the offset CORESET, then the number of PRBs corresponding to P1 and the number of PRBs corresponding to P2.

That is, the relative location of the offset CORESET in its corresponding LBT2 and the relative location of the reference CORESET in its corresponding LBT1 remain unchanged. And the number of PRBs between the first PRB location of the offset CORESET in the frequency domain and the first available PRB location of LBT2 where it is located is consistent with the number of PRBs between the first PRB location of the reference CORESET in the frequency domain and the first available PRB location of LBT1 where it is located.

In S606, the control resource set is monitored at the second location information in the second sub-band.

As an implementation manner, the frequency domain resource size of the control resource set in the first sub-band is the same as the frequency domain resource size of the control resource set in the second sub-band, that is, the size of the frequency domain resources of the reference CORESET and that of the offset CORESET are the same. As shown in FIG. 7, LBT2 represents the second sub-band, then C2 represents the location of the offset CORESET in LBT2. That is, in FIG. 7, the PRBs in the part of the area filled with grid lines correspond to the location of the offset CORESET in the second sub-band, the number of PRBs corresponding to C2 represents the frequency domain resource size of the offset CORESET, C1 represents the location of the reference CORESET in LBT1, and the number of PRBs corresponding to C1 represents the frequency domain resource size of the reference CORESET, then it can be seen that the number of PRBs corresponding to C2 is 20, and the number of PRBs corresponding to C1 is also 20, that is, the frequency domain resource size of the reference CORESET and that of the offset CORESET are the same.

In addition, the meaning of the frequency domain resource size of the control resource set in the first sub-band being the same as the frequency domain resource size of the control resource set in the second sub-band, and the PRB distribution in the reference CORESET and the offset CORESET may be referred to the description of the above-mentioned embodiments, and will not be repeated here.

It should be noted that, for the parts that are not described in detail in the foregoing steps, the foregoing embodiments may be referred to, and will not be repeated here.

Figure 8:
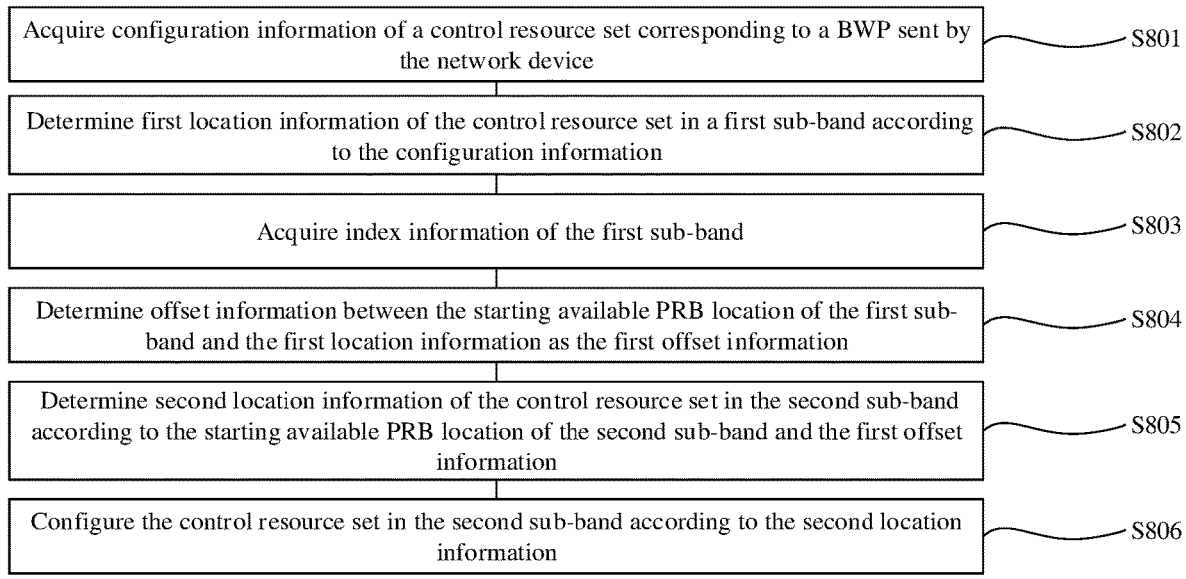
FIG. 8 shows a flowchart of a method for determining a control resource set according to still another embodiment of the present application.

Referring to FIG. 8, another embodiment of the present application provides a method for determining a control resource set. The execution subject of the method may be a UE. In the method, the index information of the first sub-band is the guard band ending PRB location of the first sub-band, and the method includes: S801 to S806.

In S801, configuration information of a control resource set corresponding to a BWP sent by a network device is acquired.

In S802, first location information of the control resource set in a first sub-band is determined according to the configuration information.

In S803, index information of the first sub-band is acquired.

The index information of the first sub-band is the guard band ending PRB location of the first sub-band. As an implementation manner, the manner for the UE to obtain the guard band ending PRB location of the first sub-band may be that the base station uses configuration information or other information to clearly inform the UE of the guard band ending PRB location of the first sub-band. As another implementation manner, the way for the UE to obtain the guard band ending PRB location of the first sub-band may also be that the base station informs the UE of a length of the guard band and a starting PRB location of the guard band through configuration information or other information. The length of the guard band refers to the number of PRBs corresponding to the guard band. Then, according to the length of the guard band and the starting PRB location of the guard band, the UE can calculate the guard band ending PRB location of the first sub-band.

Figure 9:
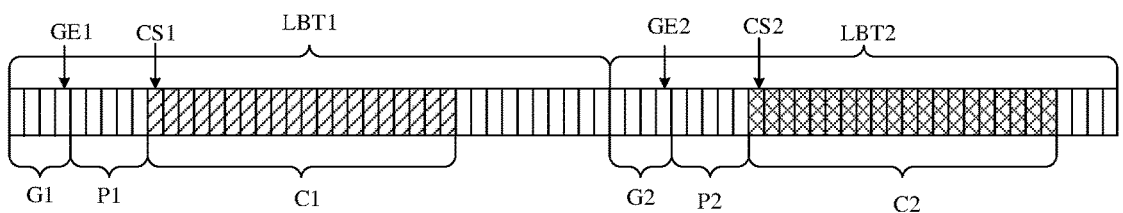
FIG. 9 shows a schematic diagram of the locations of the reference CORESET and the offset CORESET according to still another embodiment of the present application.

As shown in FIG. 9, LBT1 represents the first sub-band, GE1 represents the guard band ending PRB location of the first sub-band, and G1 represents the guard band of the first sub-band. Among them, the guard band is also called a guard frequency band, which refers to an interval between frequency bands, does not have a transmission function, and is used to ensure that the frequency bands do not interfere with each other. Then the guard band ending PRB location may be the last bit of the guard band of the sub-band. As shown in FIG. 9, GE1 is the location corresponding to the rightmost PRB in G1. In addition, similar to FIGS. 4 and 6, each square in FIG. 9 also corresponds to one PRB.

In the embodiment of the present application, the CORESET in the first sub-band may also be named as the reference CORESET.

In S804, offset information between the guard band ending PRB location of the first sub-band and the first location information is determined as the first offset information.

In the embodiment of the present application, the offset information may indicate a relative location or a relative distance between a reference point location of the reference CORESET in the first sub-band and the guard band ending PRB location of the first sub-band. As an implementation manner, the offset information may indicate the number of PRBs between the reference point location of the reference CORESET in the first sub-band and the guard band ending PRB location of the first sub-band.

As an implementation manner, the aforementioned reference point location may be the starting PRB location of the reference CORESET in the first sub-band, that is, the first location information is the starting PRB location of the reference CORESET in the first sub-band. As shown in FIG. 9, C1 is the first location information of the reference CORESET in the first sub-band, then C1 occupies a plurality of PRBs. As shown in FIG. 9, C1 corresponds to 20 PRBs, that is, in FIG. 9, the PRBs in the area filled with diagonal lines correspond to the location of the reference CORESET in the first sub-band. The starting PRB location of the reference CORESET in the first sub-band may be the location corresponding to the PRB that is closest to the guard band ending PRB location of the first sub-band among the plurality of PRBs occupied by the reference CORESET in the first sub-band. As shown in FIG. 9, the leftmost PRB of C1 is the starting PRB location of the reference CORESET in the first sub-band, that is, CS1 in FIG. 9 is the starting PRB location of the reference CORESET in the first sub-band.

That is to say, the starting PRB location of CORESET in the corresponding sub-band may be the location corresponding to the PRB closest to the guard band ending PRB location of the sub-band among all PRBs corresponding to CORESET in the corresponding sub-band.

The first offset information is the offset information between the starting PRB location of the reference CORESET in the first sub-band and the guard band ending PRB location of the first sub-band. Specifically, the offset information may be the offset between the starting PRB location of the reference CORESET in the first sub-band and the guard band ending PRB location of the first sub-band. As shown in FIG. 9, P1 represents the offset between the guard band ending PRB location GE1 and CS1 of the first sub-band, and the offset may be represented by the number of PRBs. As shown in FIG. 9, the offset represented by P1 is 5 PRBs.

In S805, second location information of the control resource set in a second sub-band is determined according to the guard band ending PRB location of the second sub-band and the first offset information.

In the embodiment of the present application, the second sub-band also includes one reference location point.

For example, the reference location point may also be the guard band ending PRB location of the second sub-band. According to the guard band ending PRB location of the second sub-band and the first offset information, it is possible to determine the offset information of CORESET in the second sub-band relative to the guard band ending PRB location of the second sub-band.

As an implementation manner, the CORESET configured in the second sub-band is named offset CORESET. The offset information of the offset CORESET in the second sub-band may be named second offset information, and then the second offset information may be offset information between the starting PRB location of CORESET in the second sub-band and the guard band ending PRB location of the second sub-band. As an implementation manner, the second offset information may be an offset between the starting PRB location of CORESET in the second sub-band and the guard band ending PRB location of the second sub-band, that is, the number of PRBs. Then the first offset information and the second offset information may be the same, or may be changed regularly.

For example, the second sub-band is a collective term for a plurality of sub-bands for which CORESET is not set by the base station. In the plurality of sub-bands, the number of PRBs between the starting PRB location of CORESET and the starting available PRB location of the sub-band changes regularly, for example, changes in the form of an arithmetic sequence of 4 PRBs, 5 PRBs, 6 PRBs, etc.

In the embodiment of the present application, the first offset information and the second offset information are the same, that is, in all sub-bands that need to be detected by the UE, the numbers of PRBs between the starting PRB location of CORESET and the guard band ending PRB location of the sub-band are the same.

As shown in FIG. 9, P1 represents the first offset information, P2 represents the second offset information, GE1 is the guard band ending PRB location of the first sub-band, GE2 is the guard band ending PRB location of the second sub-band, CS1 is the starting PRB location of the reference CORESET, and CS2 is the starting PRB location of the offset CORESET, then the number of PRBs corresponding to P1 and the number of PRBs corresponding to P2.

That is, the relative location of the offset CORESET in its corresponding LBT2 and the relative location of the reference CORESET in its corresponding LBT1 remain unchanged. The number of PRBs from the location of the first PRB in the frequency domain of the offset CORESET to the location of the last PRB of the guard band of LBT2 where the offset CORESET is located is consistent with the number of PRBs from the location of the first PRB in the frequency domain of the reference CORESET to the location of the last PRB of the guard band of LBT1 where the reference CORESET is located.

In S806, the control resource set is monitored at the second location information in the second sub-band.

As an implementation manner, the frequency domain resource size of the control resource set in the first sub-band is the same as the frequency domain resource size of the control resource set in the second sub-band, that is, the size of the frequency domain resources of the reference CORESET is the same as that of the offset CORESET. As shown in FIG. 9, LBT2 represents the second sub-band, then C2 represents the location of the offset CORESET in LBT2, that is, in FIG. 9, the PRBs in the part of the area filled with grid lines correspond to the location of the offset CORESET in the second sub-band, the number of PRBs corresponding to C2 represents the frequency domain resource size of the offset CORESET, C1 represents the location of the reference CORESET in LBT1, and the number of PRBs corresponding to C1 represents the frequency domain resource size of the reference CORESET, then it can be seen that the number of PRBs corresponding to C2 is 20, and the number of PRBs corresponding to C1 is also 20, that is, the frequency domain resource size of the reference CORESET is the same as that of the offset CORESET.

In addition, the meaning of the frequency domain resource size of the control resource set in the first sub-band being the same as the frequency domain resource size of the control resource set in the second sub-band, and the PRB distribution in the reference CORESET and the offset CORESET may be referred to the description of the above-mentioned embodiment, and will not be repeated here.

It should be noted that, for the parts that are not described in detail in the foregoing steps, the foregoing embodiments may be referred to, and will not be repeated here.

Figures 10, 11:
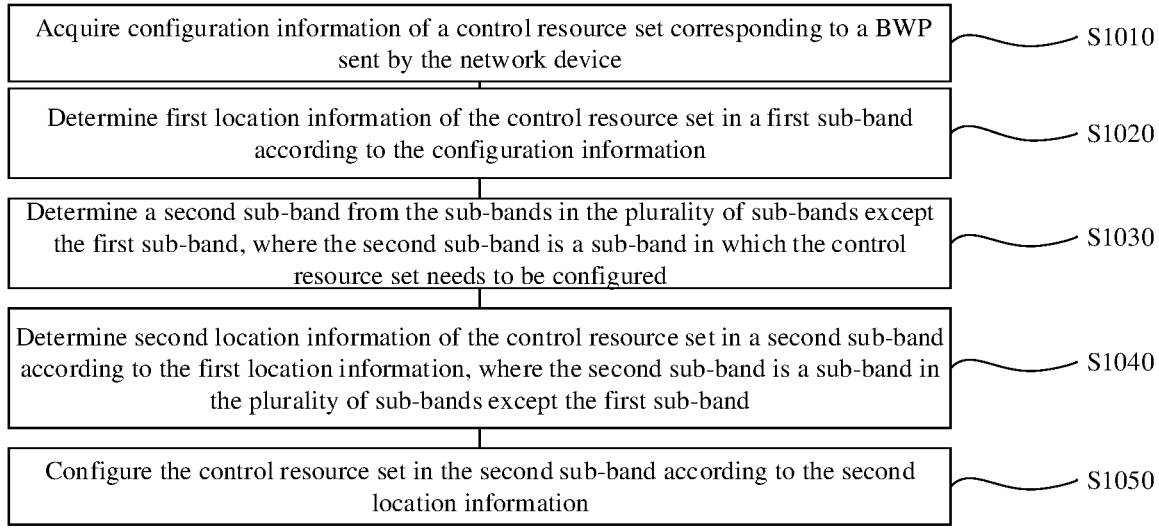
FIG. 10 shows a flowchart of a method for determining a control resource set according to yet another embodiment of the present application.
FIG. 11 shows a schematic diagram of codes corresponding to frequencyDomainResources according to an embodiment of the present application.

In addition, as described in the above embodiments, the sub-band(s) that needs to be configured with CORESET by the UE may be determined in the sub-bands which are not configured with CORESET by the base station. That is, the sub-band(s) to be detected may be determined from a plurality of sub-bands except the sub-band corresponding to CORESET. Referring to FIG. 10, another embodiment of the present application provides a method for determining a control resource set. The execution subject of the method may be a UE, and the method includes: S1010 to S1050.

In S1010, configuration information of the control resource set corresponding to a BWP sent by the network device is acquired. In S1020, first location information of the control resource set in a first sub-band is determined according to the configuration information. In S1030, a second sub-band is determined from the sub-bands in the plurality of sub-bands except the first sub-band, where the second sub-band is a sub-band which is determined to need to be configured with the control resource set.

In some embodiments, as shown in FIG. 11, the configuration of the reference CORESET may be configured by frequencyDomainResources in ControlResourceSet IE in the NR R15 protocol.

As shown in FIG. 12, the configuration of the offset CORESET may be configured by controlResourceSetId and multiple monitoring location in SearchSpace IE. When controlResourceSetId=reference CORESET ID, and multiple monitoring location is configured, the UE may confirm that there is a sub-band that needs to be configured with CORESET in other sub-bands corresponding to the BWP (that is, the sub-bands except the first sub-band). As an implementation manner, the UE may determine all sub-bands except the first sub-band among the plurality of sub-bands as the second sub-band. That is, the UE needs to detect the first sub-band corresponding to the reference CORESET, and also needs to detect all sub-bands except the first sub-band, then it is determined that all sub-bands except the first sub-band need to be configured with the offset CORESET.

In some embodiments, the base station sends a piece of indication information to the UE to indicate whether the UE needs to perform detection operations on all sub-bands except for the sub-band where the reference CORESET is located.

For example, the indication information may be a parameter, and the UE reads the parameter and judges whether the parameter is a specified parameter. If the parameter is the specified parameter, it is determined that the UE needs to perform detection operations on all sub-bands except for the sub-band where the reference CORESET is located, that is, all sub-bands except the first sub-band in the plurality of sub-bands are determined as the second sub-band. If the parameter is not the specified parameter, the UE only needs to perform detection operation on the sub-band where the reference CORESET is located.

As an implementation manner, the base station indicates whether the UE needs to perform detection operations on all sub-bands except for the sub-band where the reference CORESET is located through the aforementioned multiple monitoring location. As shown in FIG. 13, if multiple monitoring location is enable, the UE determines that it needs to perform detection of the offset CORESET on all other configured sub-bands at the same time. If multiple monitoring location is disable, the UE only needs to detect on the sub-band where CORESET is located.

Figure 14:
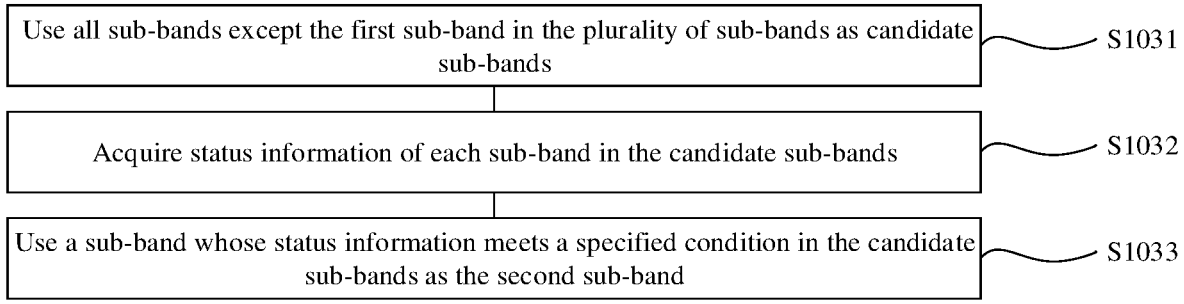
FIG. 14 shows a flowchart of S1030 in FIG. 10.

As another implementation manner, the UE may use part of the sub-bands in all the sub-bands except the first sub-band among the plurality of sub-bands as the second sub-band, that is, the UE needs to detect the first sub-band corresponding to the reference CORESET, and also needs to detect part of the sub-bands in all sub-bands except the first sub-band, and then it is determined that this part of the sub-band needs to be configured with the offset CORESET. As shown in FIG. 14, this step S1030 may include: S1031 to S1033.

In S1031, all sub-bands except the first sub-band in the plurality of sub-bands are determined as candidate sub-bands.

In S1032, status information of each sub-band in the candidate sub-bands is acquired.

The base station may configure one piece of status information for each sub-band, so that the UE can determine whether it needs to detect the sub-band corresponding to the status information according to the status information.

The status information may be a numerical value, and then the UE can determine whether to detect the sub-band corresponding to the status information through the numerical value.

In addition, the status information may also be a piece of message content, such as a piece of text information, and then the UE may determine which sub-bands need to be detected by parsing the text information.

In the embodiments of the present application, the status information may be a numerical value. Specifically, the status information may be a bit value.

As an implementation manner, the base station sets a corresponding bit group for the BWP, the bit group includes a plurality of bit values, each of the bit values corresponds to one of the sub-bands, and the bit value corresponding to the sub-band serves as the status information of the sub-band, then the UE can obtain the bit group, thereby obtaining the status information of each sub-band.

In some embodiments, the base station configures one bitmap for multiple monitoring location, and the UE determines which sub-bands need to be detected according to bitmap of multiple monitoring location. If the number of the sub-bands is M, the bitmap is composed of M bit values, and each bit value corresponds to one sub-band, then the M bit values form a bit group corresponding to the BWP.

In S1033, in the candidate sub-bands, a sub-band whose status information meets a specified condition is determined as the second sub-band.

The specified condition may be set according to the status information, and used as a criterion for judging whether the sub-band corresponding to the status information needs to be detected. Then, if the status information is a message content, the way to determine whether the status information meets the specified condition is to determine whether the message content includes a specified keyword, and if the specified keyword is included, then it is determined that the status information meets the specified condition. And if the status information is a numeric value, the specified condition may be a specified value.

In the embodiment of the present application, the status information is a numerical value, specifically, it may be the above-mentioned bit value.

Then, an implementation manner in which the sub-band whose status information meets the specified condition is determined as the second sub-band may be that in the candidate sub-bands, the sub-band whose bit value is a specified value is determined as the second sub-band. As an embodiment, the specified value is 1.

Taking the above-mentioned bitmap as an example, if the bit of a certain sub-band is 1, the UE needs to detect the offset CORESET in the corresponding sub-band, and if it is 0, no detection is required. Therefore, the UE reads the bitmap, determines the sub-band whose bit is 1, and determines the sub-band whose bit is 1 as the sub-band to be detected, that is, the second sub-band.

In S1040, second location information of the control resource set in a second sub-band is determined according to the first location information, where the second sub-band is a sub-band in the plurality of sub-bands except the first sub-band.

For the implementation manner of determining the second location information, reference may be made to the foregoing embodiments, and details are not described herein again.

In S1050, the control resource set is monitored at the second location information in the second sub-band.

In addition, it should be noted that when the base station configures the CORESET for the BWP, the BWP may be configured with a plurality of CORESETs, and the CORESET may span the BWP, that is, a part of the CORESET is located in one BWP and the other part is located in another BWP. If the base station requires the UE to monitor the offset CORESET on different sub-bands, the base station needs to configure one reference CORESET, and the frequency domain resources of the reference CORESET are completely included in any sub-band of the plurality of sub-bands. If the CORESET configured by the base station spans the plurality of sub-bands, the CORESET cannot be used as a reference CORESET, and the UE will not determine the offset CORESET according to the CORESET.

As an implementation manner, if the base station configures a plurality of CORESETs for the BWP of the UE, one reference CORESET may be determined from the plurality of CORESETs, and the basis for determination may be that the CORESET that does not span the plurality of sub-bands is used as the reference CORESET, and if there are a plurality of CORESETs that do not span the plurality of sub-bands, one CORESET may be selected therefrom as the reference CORESET.

For example, BWP corresponds to four sub-bands, which are named sub-band 1, sub-band 2, sub-band 3, and sub-band 4, respectively. The base station configures CORESET1 in sub-band 1, the base station configures CORESET2 in sub-band 2, and does not configure CORESET in sub-band 3 and sub-band 4. The base station instructs the UE to monitor the reference CORESET1 or the offset CORESET1 in all sub-bands. Then, the monitoring operation of the UE is to monitor CORESET1 in sub-band 1, monitor the offset CORESET1 and CORESET2 in sub-band 2, monitor CORESET1 in sub-band 3, and monitor CORESET1 in sub-band 4.

It should be noted that, for the parts that are not described in detail in the foregoing steps, the foregoing embodiments may be referred to, and will not be repeated here.

Figure 15:
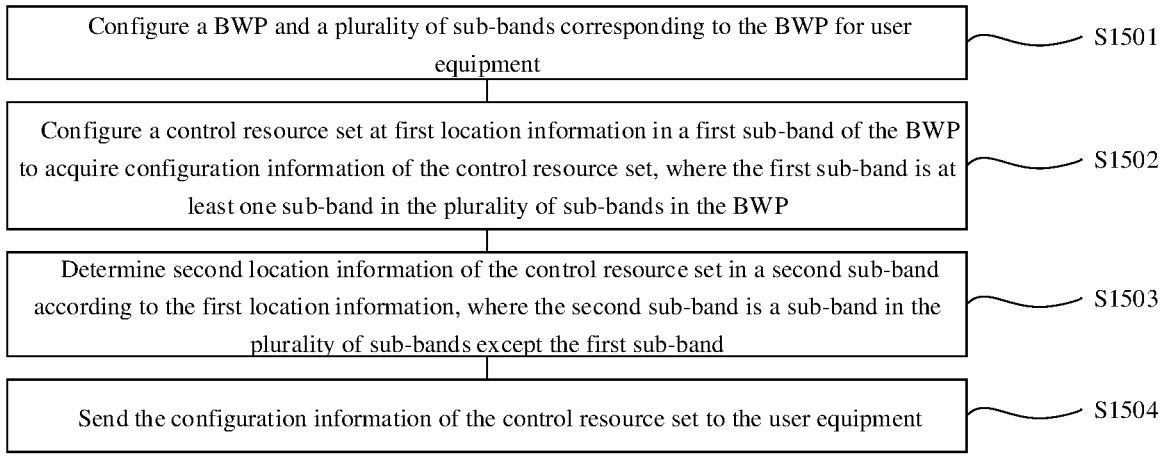
FIG. 15 shows a flowchart of a method for configuring a control resource set according to an embodiment of the present application.

Referring to FIG. 15, an embodiment of the present application provides a method for configuring a control resource set, which is applied to the above-mentioned communication system. The execution subject of the method is a network device, and specifically, the execution subject may be a base station. The method includes: S1201 to S1204.

In S1201, a BWP and a plurality of sub-bands corresponding to the BWP are configured for a user equipment.

In S1202, a control resource set is configured at first location information in a first sub-band of the BWP to acquire configuration information of the control resource set, where the first sub-band is at least one sub-band in the plurality of sub-bands in the BWP.

In S1203, second location information of the control resource set in a second sub-band is determined according to the first location information, where the second sub-band is a sub-band in the plurality of sub-bands except the first sub-band.

In S1204, the configuration information of the control resource set is sent to the user equipment.

The configuration information of the control resource set is sent to the user equipment, and then the user equipment monitors the CORESET in the second sub-band according to the above method for determining the control resource set.

It should be noted that, for the implementation of the foregoing steps, reference may be made to the foregoing embodiments of the method for determining a control resource set in which the UE is the execution subject, and details are not described herein again.

In addition, the execution order of the above S1204 and S1203 is not limited, that is, it is not necessarily that S1203 is executed first and then S1204 is executed. It is possible to execute the operation of S1204 first, and then execute the operation of S1203.

Figure 16:
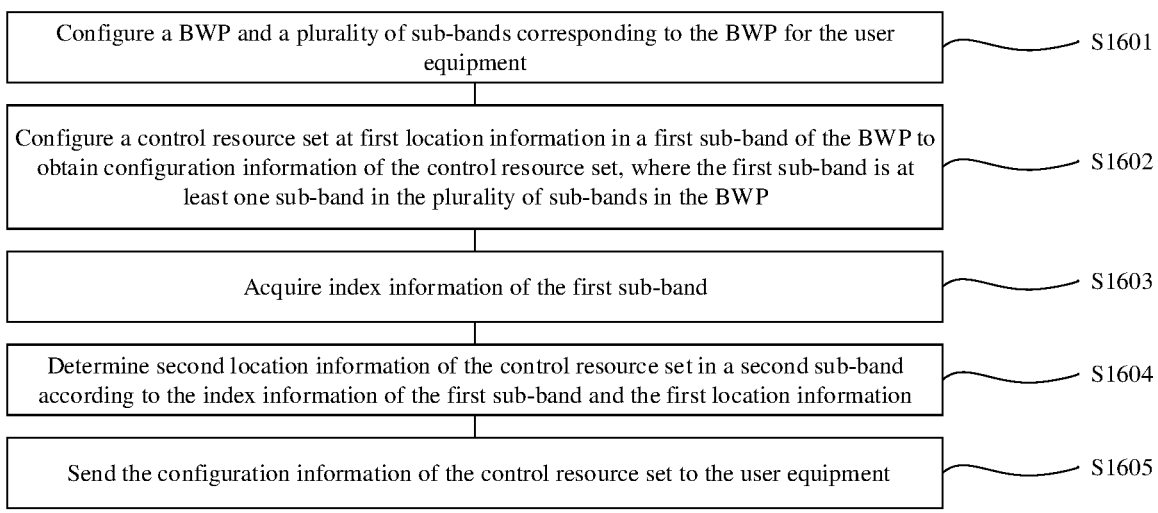
FIG. 16 shows a flowchart of a method for configuring a control resource set according to another embodiment of the present application.

Referring to FIG. 16, an embodiment of the present application provides a method for configuring a control resource set, which is applied to the above-mentioned communication system. The execution subject of the method is a network device, and specifically, the execution subject may be a base station. The method includes: S1301 to S1305.

In S1301, a BWP and a plurality of sub-bands corresponding to the BWP are configured for a user equipment.

In S1302, a control resource set is configured at first location information in a first sub-band of the BWP to obtain configuration information of the control resource set, where the first sub-band is at least one sub-band in the plurality of sub-bands in the BWP.

In S1303, index information of the first sub-band is acquired.

The index information includes at least one of a starting PRB location, a starting available PRB location, and a guard band ending PRB location.

In S1304, second location information of the control resource set in a second sub-band is determined according to the index information of the first sub-band and the first location information.

The frequency domain resource size of the control resource set in the first sub-band is the same as the frequency domain resource size of the control resource set in the second sub-band.

As an implementation manner, when the index information is the starting PRB location, the implementation manner of determining the second location information of the control resource set in the second sub-band according to the index information of the first sub-band and the first location information may be: determining offset information between the starting PRB location of the first sub-band and the first location information as the first offset information; and according to the starting PRB location of the second sub-band and the first offset information, determining the second location information of the control resource set in the second sub-band.

The first location information includes the starting PRB location of the control resource set in the first sub-band; and an implementation manner of determining the offset information between the starting PRB location of the first sub-band and the first location information as the first offset information may be: determining offset information between the starting PRB location of the control resource set in the first sub-band and the starting PRB location of the first sub-band as the first offset information.

The second location information includes the starting PRB location of the control resource set in the second sub-band, and the first offset information and the second offset information are consistent, where the second offset information is the offset information between the starting PRB location of the control resource set in the second sub-band and the starting PRB location of the second sub-band.

As another implementation manner, the index information is the starting available PRB location, and the implementation manner of determining the second location information of the control resource set in the second sub-band according to the index information of the first sub-band and the first location information may be: determining the offset information between the starting available PRB location of the first sub-band and the first location information as the first offset information; and according to the starting available PRB location of the second sub-band and the first offset information, determining the second location information of the control resource set in the second sub-band.

The first location information includes the starting PRB location of the control resource set in the first sub-band; and an implementation manner of determining the offset information between the starting available PRB location of the first sub-band and the first location information as the first offset information may be: determining the offset information between the starting PRB location of the control resource set in the first sub-band and the starting available PRB of the first sub-band as the first offset information.

The second location information includes the starting PRB location of the control resource set in the second sub-band, and the first offset information and the second offset information are consistent, where the second offset information is the offset information between the starting PRB location of the control resource set in the second sub-band and the starting available PRB location of the second sub-band.

As yet another implementation manner, the index information is a guard band ending PRB location, and the implementation manner of determining the second location information of the control resource set in the second sub-band according to the index information of the first sub-band and the first location information is: determining the offset information between the guard band ending PRB location of the first sub-band and the first location information as the first offset information; and determining the second location information of the control resource set in the second sub-band according to the guard band ending PRB location of the second sub-band and the first offset information.

The first location information includes the starting PRB location of the control resource set in the first sub-band, and the implementation manner of determining the first offset information between the guard band ending PRB location of the first sub-band and the first location information as the first offset information is to determine the offset information between the starting PRB location of the control resource set in the first sub-band and the guard band ending PRB location of the first sub-band as the first offset information.

The second location information includes the starting PRB location of the control resource set in the second sub-band, the first offset information and the second offset information are consistent, and the second offset information is the offset information between the starting PRB location of the control resource set in the second sub-band and the guard band ending PRB location of the second sub-band.

In S1305, the configuration information of the control resource set is sent to the user equipment.

As an implementation manner, the generated indication information and the configuration information of the control resource set are sent to the user equipment, and the indication information is used to instruct the user equipment to determine the second sub-band from the sub-bands in the plurality of sub-bands except the first sub-band, where the second sub-band is a sub-band that is confirmed that the control resource set needs to be monitored thereon.

In some embodiments, the indication information is used to instruct the user equipment to determine all sub-bands except the first sub-band among the plurality of sub-bands as the second sub-band.

In other embodiments, all the sub-bands except the first sub-band in the plurality of sub-bands are determined as candidate sub-bands; the status information is configured for each sub-band in the candidate sub-bands; and the status information corresponding to each sub-band is sent to the user equipment as indication information, where the indication information is used to instruct the user equipment to determine the sub-band whose status information meets a specified condition as the second sub-band.

The implementation manner of configuring status information for each sub-band in the candidate sub-bands may be to set a corresponding bit group for the BWP, where the bit group includes a plurality of bit values, and each bit value corresponds to one sub-band, the bit value corresponding to the sub-band is determined as the status information of the sub-band, and the indication information is used to instruct the user equipment to determine the sub-band whose bit value is a specified value in the candidate sub-bands as the second sub-band. The specified value may be 1.

It should be noted that, for the implementation of the foregoing steps, reference may be made to the foregoing embodiment of the method for determining a control resource set in which the UE is the execution subject, and details are not described herein again.

Figure 17:
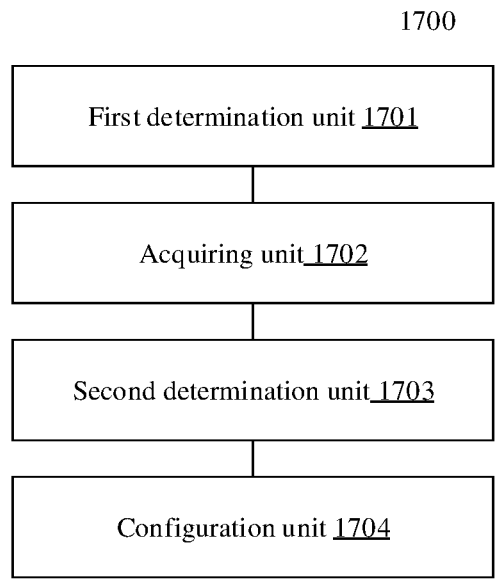
FIG. 17 shows a block diagram of an apparatus for determining a control resource set according to an embodiment of the present application.

Referring to FIG. 17, which shows a structural block diagram of an apparatus 1700 for determining a control resource set according to an embodiment of the present application, the apparatus may include: a first determination unit 1701, an acquiring unit 1702, a second determination unit 1703, and a configuration unit 1704.

The first determination unit 1701 is configured to acquire configuration information of a control resource set corresponding to a BWP sent by a network device.

The acquiring unit 1702 is configured to determine first location information of the control resource set in a first sub-band according to the configuration information, where the first sub-band is at least one sub-band of a plurality of sub-bands in the BWP.

The second determination unit 1703 is configured to determine, according to the first location information, second location information of the control resource set in a second sub-band, where the second sub-band is a sub-band in the plurality of sub-bands except the first sub-band.

The configuration unit 1704 is configured to configure the control resource set in the second sub-band according to the second location information.

Those skilled in the art can clearly understand that, for the convenience and conciseness of the description, the specific working process of the apparatus and module described above may refer to the corresponding process in the foregoing method embodiments, which will not be repeated here.

Figure 18:
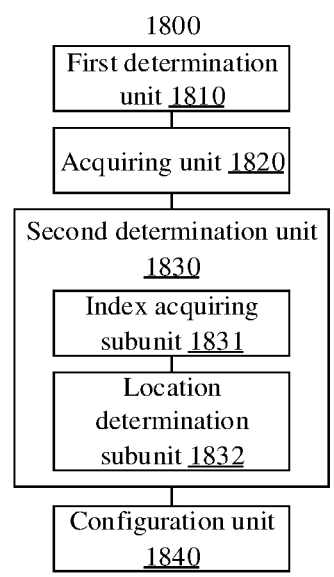
FIG. 18 shows a block diagram of an apparatus for determining a control resource set according to another embodiment of the present application.

Referring to FIG. 18, which shows a structural block diagram of an apparatus 1800 for determining a control resource set according to an embodiment of the present application, the apparatus may include: a first determination unit 1810, an acquiring unit 1820, a second determination unit 1830, and a configuration unit 1840.

The first determination unit 1810 is configured to acquire configuration information of a control resource set corresponding to a BWP sent by a network device.

The acquiring unit 1820 is configured to determine first location information of the control resource set in a first sub-band according to the configuration information, where the first sub-band is at least one sub-band of a plurality of sub-bands in the BWP.

The second determination unit 1830 is configured to determine, according to the first location information, second location information of the control resource set in a second sub-band, where the second sub-band is a sub-band in the plurality of sub-bands except the first sub-band.

The second determination unit 1830 includes an index acquiring subunit 1831 and a location determination subunit 1832.

The index acquiring subunit 1831 is configured to acquire index information of the first sub-band. The index information includes at least one of a starting PRB location, a starting available PRB location, and a guard band ending PRB location.

The location determination subunit 1832 is configured to determine second location information of the control resource set in the second sub-band according to the index information of the first sub-band and the first location information.

Further, when the index information is the starting PRB location, the location determination subunit 1832 is configured to determine the offset information between the starting PRB location of the first sub-band and the first location information, as the first offset information; and determining the second location information of the control resource set in the second sub-band according to the starting PRB location of the second sub-band and the first offset information.

Specifically, the first location information includes the starting PRB location of the control resource set in the first sub-band. The location determination subunit 1832 is further configured to determine the offset information between the starting PRB location of the control resource set in the first sub-band and the starting PRB location of the first sub-band, as the second offset information. The second location information includes the starting PRB location of the control resource set in the second sub-band, and the first offset information and the second offset information are consistent, where the second offset information is the offset information between the starting PRB location of the control resource set in the second sub-band and the starting PRB location of the second sub-band.

Further, when the index information is the starting available PRB location, the location determination subunit 1832 is configured to determine the offset information between the starting available PRB location of the first sub-band and the first location information, as the first offset information; and determine the second location information of the control resource set in the second sub-band according to the starting available PRB location of the second sub-band and the first offset information.

Specifically, the first location information includes the starting PRB location of the control resource set in the first sub-band; and the location determination subunit 1832 is further configured to determine the offset information between the starting PRB location of the control resource set in the first sub-band and the starting available PRB location of the first sub-band as the first offset information. The second location information includes the starting PRB location of the control resource set in the second sub-band, and the first offset information and the second offset information are consistent, where the second offset information is the offset information between the starting PRB location of the control resource set in the second sub-band and the starting available PRB location of the second sub-band.

Further, when the index information is the guard band ending PRB location, the location determination subunit 1832 is configured to determine the offset information between the guard band ending PRB location of the first sub-band and the first location information, as the first offset information; and determine the second location information of the control resource set in the second sub-band according to the guard band ending PRB location of the second sub-band and the first offset information.

Specifically, the first location information includes the starting PRB location of the control resource set in the first sub-band. The location determination subunit 1832 is further configured to determine the offset information between the starting PRB location of the control resource set in the first sub-band and the guard band ending PRB location of the first sub-band, as the first offset information. The second location information includes the starting PRB location of the control resource set in the second sub-band, and the first offset information and the second offset information are consistent, where the second offset information is the offset information between the starting PRB location of the control resource set in the second sub-band and the guard band ending PRB location of the second sub-band.

The configuration unit 1840 is configured to configure the control resource set in the second sub-band according to the second location information.

Those skilled in the art can clearly understand that, for the convenience and conciseness of the description, the specific working process of the apparatus and module described above may refer to the corresponding process in the foregoing method embodiments, which will not be repeated here.

Figure 19:
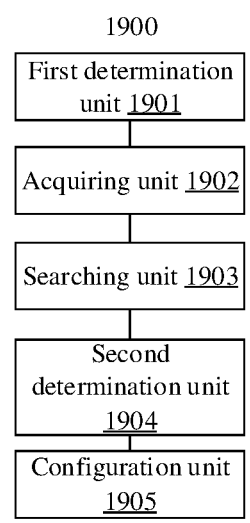
FIG. 19 shows a block diagram of an apparatus for determining a control resource set according to another embodiment of the present application.

Referring to FIG. 19, which shows a structural block diagram of an apparatus 1900 for determining a control resource set according to an embodiment of the present application, the apparatus may include: a first determination unit 1901, an acquiring unit 1902, a searching unit 1903, a second determination unit 1904, and a configuration unit 1904.

The first determination unit 1901 is configured to acquire configuration information of a control resource set corresponding to a BWP sent by a network device.

The acquiring unit 1902 is configured to determine first location information of the control resource set in a first sub-band according to the configuration information, where the first sub-band is at least one sub-band of a plurality of sub-bands in the BWP.

The searching unit 1903 is configured to determine a second sub-band from the sub-bands except the first sub-band among the plurality of sub-bands, where the second sub-band is a sub-band that is confirmed to need to be configured with a control resource set.

Further, the searching unit 1903 is further configured to determine all the sub-bands except the first sub-band among the plurality of sub-bands as the second sub-band.

Further, the searching unit 1903 is further configured to determine all sub-bands except the first sub-band in the plurality of sub-bands as candidate sub-bands; acquire status information of each sub-band in the candidate sub-bands; among the candidate sub-bands, determine a sub-band whose status information meets a specified condition as the second sub-band.

Specifically, the searching unit 1903 is further configured to acquire a bit group corresponding to the BWP, the bit group including a plurality of bit values, each of the bit values corresponding to one of the sub-bands, and the bit value corresponding to the sub-band being determined as the status information of the sub-band; and in the candidate sub-bands, determine the sub-band whose bit value is a specified value as the second sub-band.

The second determination unit 1904 is configured to determine, according to the first location information, second location information of the control resource set in a second sub-band, where the second sub-band is a sub-band in the plurality of sub-bands except the first sub-band.

The configuration unit 1905 is configured to configure the control resource set in the second sub-band according to the second location information.

Those skilled in the art can clearly understand that, for the convenience and conciseness of the description, the specific working process of the apparatus and module described above may refer to the corresponding process in the foregoing method embodiments, which will not be repeated here.

Figure 20:
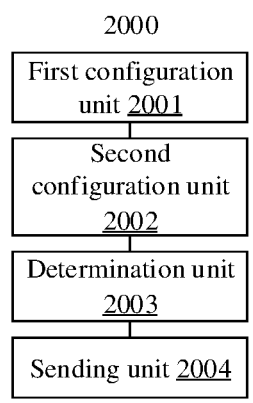
FIG. 20 shows a block diagram of an apparatus for configuring a control resource set according to an embodiment of the present application.

Referring to FIG. 20, which shows a structural block diagram of an apparatus 2000 for configuring a control resource set according to an embodiment of the present application, the apparatus is applied to a network device of a communication system, the communication system further includes a user equipment, and the apparatus may include: a first configuration unit 2001, a second configuration unit 2002, a determination unit 2003, and a sending unit 2004.

The first configuration unit 2001 is configured to configure a BWP and a plurality of sub-bands corresponding to the BWP for the user equipment.

The second configuration unit 2002 is configured to configure a control resource set at first location information in a first sub-band of the BWP to acquire configuration information of the control resource set, where the first sub-band is at least one sub-band in the plurality of sub-bands in the BWP.

The determination unit 2003 is configured to determine second location information of the control resource set in a second sub-band according to the first location information, where the second sub-band is a sub-band in the plurality of sub-bands except the first sub-band.

The sending unit 2004 is configured to send the configuration information of the control resource set to the user equipment, and instruct the user equipment to monitor the second sub-band according to the foregoing method.

Those skilled in the art can clearly understand that, for the convenience and conciseness of the description, the specific working process of the apparatus and module described above may refer to the corresponding process in the foregoing method embodiments, which will not be repeated here.

Figure 21:
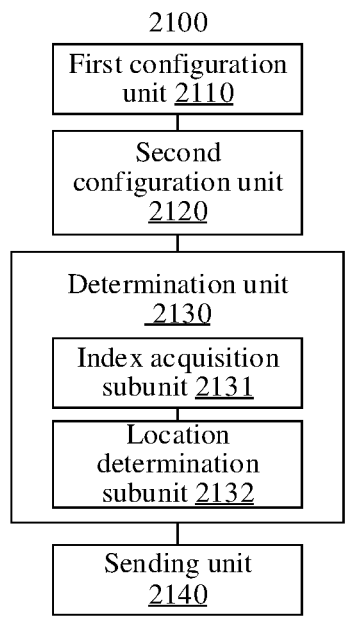
FIG. 21 shows a block diagram of an apparatus for configuring a control resource set according to another embodiment of the present application.

Referring to FIG. 21, which shows a structural block diagram of an apparatus 2100 for configuring a control resource set according to an embodiment of the present application, the apparatus is applied to a network device of a communication system, the communication system also includes a user equipment, and the apparatus may include: a first configuration unit 2110, a second configuration unit 2120, a determination unit 2130, and a sending unit 2140.

The first configuration unit 2110 is configured to configure a BWP and a plurality of sub-bands corresponding to the BWP for the user equipment.

The second configuration unit 2120 is configured to configure a control resource set at first location information in a first sub-band of the BWP to acquire configuration information of the control resource set, where the first sub-band is at least one sub-band in the plurality of sub-bands in the BWP.

The determination unit 2130 is configured to determine second location information of the control resource set in a second sub-band according to the first location information, where the second sub-band is a sub-band in the plurality of sub-bands except the first sub-band.

The determination unit includes an index acquisition subunit 2131 and a location determination subunit 2132.

The index acquisition subunit 2131 is configured to acquire index information of the first sub-band. The index information includes at least one of a starting PRB location, a starting available PRB location, and a guard band ending PRB location.

The location determination subunit 2132 is configured to determine the second location information of the control resource set in the second sub-band according to the index information of the first sub-band and the first location information.

Further, when the index information is the starting PRB location, the location determination subunit 2132 is configured to determine the offset information between the starting PRB location of the first sub-band and the first location information, as the first location information; and determine the second location information of the control resource set in the second sub-band according to the starting PRB location of the second sub-band and the first offset information.

Specifically, the first location information includes the starting PRB location of the control resource set in the first sub-band. The location determination subunit 2132 is further configured to determine the offset information between the starting PRB location of the control resource set in the first sub-band and the starting PRB location of the first sub-band, as the second offset information. The second location information includes the starting PRB location of the control resource set in the second sub-band, and the first offset information and the second offset information are consistent, where the second offset information is the offset information between the starting PRB location of the control resource set in the second sub-band and the starting PRB location of the second sub-band.

Further, when the index information is the starting available PRB location, the location determination subunit 2132 is configured to determine the offset information between the starting available PRB location of the first sub-band and the first location information, as the first offset information; and determine the second location information of the control resource set in the second sub-band according to the starting available PRB location of the second sub-band and the first offset information.

Specifically, the first location information includes the starting PRB location of the control resource set in the first sub-band; the location determination subunit 2132 is further configured to determine the offset information between the starting PRB location of the control resource set in the sub-band and the starting available PRB location of the first sub-band as the first offset information. The second location information includes the starting PRB location of the control resource set in the second sub-band, and the first offset information and the second offset information are consistent, where the second offset information is the offset information between the starting PRB location of the control resource set in the second sub-band and the starting available PRB location of the second sub-band.

Further, when the index information is the guard band ending PRB location, the location determination subunit 2132 is configured to determine the offset information between the guard band ending PRB location of the first sub-band and the first location information, as the first offset information; and determine the second location information of the control resource set in the second sub-band according to the guard band ending PRB location of the second sub-band and the first offset information.

Specifically, the first location information includes the starting PRB location of the control resource set in the first sub-band. The location determination subunit 2132 is further configured to determine the offset information between the starting PRB location of the control resource set in the first sub-band and the guard band ending PRB location of the first sub-band, as the first offset information. The second location information includes the starting PRB location of the control resource set in the second sub-band, and the first offset information and the second offset information are consistent, where the second offset information is the offset information between the starting PRB location of the control resource set in the second sub-band and the guard band ending PRB location of the second sub-band.

The sending unit 2140 is configured to send the configuration information of the control resource set to the user equipment, and instruct the user equipment to monitor the second sub-band according to the foregoing method.

Further, the sending unit 2140 is further configured to send the generated indication information and the configuration information of the control resource set to the user equipment, where the indication information is used to instruct the user equipment to determine the second sub-band from the sub-bands in the plurality of sub-bands except the first sub-band, where the second sub-band is a sub-band on which the control resource set needs to be monitored.

In some embodiments, the indication information is used to instruct the user equipment to determine all sub-bands except the first sub-band among the plurality of sub-bands as the second sub-band.

In other embodiments, the sending unit 2140 is further configured to determine all sub-bands in the plurality of sub-bands except the first sub-band as candidate sub-bands; configure status information for each sub-band in the candidate sub-bands; send the status information corresponding to each of the sub-bands to the user equipment as indication information, where the indication information is used to instruct the user equipment to determine the sub-band for which the status information meets a specified condition as the second sub-band.

Further, the implementation manner of configuring status information for each sub-band in the candidate sub-bands by the sending unit 2140 may be to set a corresponding bit group for the BWP, the bit group including a plurality of bit values, each of the bit values corresponding to one of the sub-bands, the bit value corresponding to the sub-band being determined as the status information of the sub-band, and the indication information being used to instruct the user equipment to determine the sub-band whose bit value is a specified value in the candidate sub-bands as the second sub-band. The specified value may be 1.

In the several embodiments provided in the present application, the coupling between the modules may be electrical, mechanical or other forms of coupling.

In addition, the functional modules in the various embodiments of the present application may be integrated into one processing module, or each module may exist alone physically, or two or more modules may be integrated into one module. The above-mentioned integrated modules may be implemented in the form of hardware or software functional modules.

Figure 22:
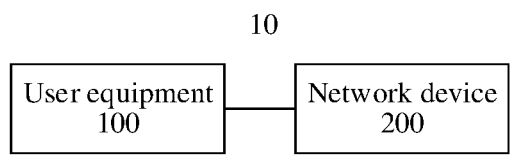
FIG. 22 shows a structural block diagram of a communication system according to an embodiment of the present application.

Referring to FIG. 22, which shows a structural block diagram of a communication system 10 provided by an embodiment of the present application, the communication system 10 may include a user equipment 100 and a network device 200.

The network device is configured to configure a BWP and a plurality of sub-bands corresponding to the BWP for the user equipment, and configure a control resource set at the first location information in a first sub-band of the BWP to acquire the configuration information of the control resource set, and according to the first location information, determine the second location information of the control resource set in a second sub-band, where the first sub-band is at least one sub-band in the plurality of sub-bands in the BWP, and the second sub-band is a sub-band except the first sub-band among the plurality of sub-bands.

The user equipment is configured to acquire the configuration information of the control resource set corresponding to the BWP sent by the network device, determine the first location information according to the configuration information, determine the second location according to the first location information, and monitor the control resource set at the second location information in the second sub-band.

Figure 23:
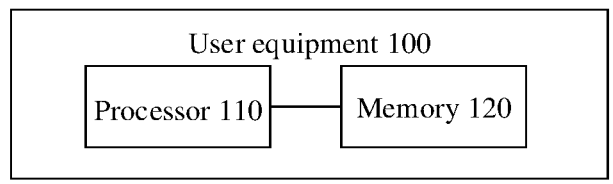
FIG. 23 shows a structural block diagram of a user equipment according to an embodiment of the present application.

As shown in FIG. 23, the user equipment 100 may include one or more of the following components: a processor 110, a memory 120, and one or more application programs, where one or more application programs may be stored in the memory 120 and configured to be executed by one or more processors 110, and one or more programs are configured to execute the method described in the foregoing method embodiment for determining a control resource set.

The processor 110 may include one or more processing cores. The processor 110 uses various interfaces and lines to connect various parts of the entire electronic device 100, and executes various functions and data processing of the electronic device 100 by running or executing instructions, programs, code sets, or instruction sets stored in the memory 120, and calling data stored in the memory 120. Optionally, the processor 110 may be implemented by adopting at least one hardware form of Digital Signal Processing (DSP), Field-Programmable Gate Array (FPGA), Programmable Logic Array (PLA). The processor 110 may be integrated with one of or a combination of a Central Processing Unit (CPU), a Graphics Processing Unit (GPU), and a modem. Among them, the CPU mainly processes the operating system, user interface, and application programs; the GPU is used for rendering and drawing of display content; the modem is used for processing wireless communication. It can be understood that the above-mentioned modem may not be integrated into the processor 110, but may be implemented by one communication chip separately.

The memory 120 may include a Random Access Memory (RAM), and may also include a Read-Only Memory. The memory 120 may be used to store instructions, programs, codes, code sets or instruction sets. The memory 120 may include a program storage area and a data storage area, where the program storage area may store instructions for implementing the operating system, instructions for implementing at least one function (such as touch function, sound playback function, image playback function, etc.), and instructions for implementing the following various method embodiments, etc. The data storage area may also store data created by the electronic device 100 during use (such as phone book, audio and video data, chat record data), and the like.

Figure 24:
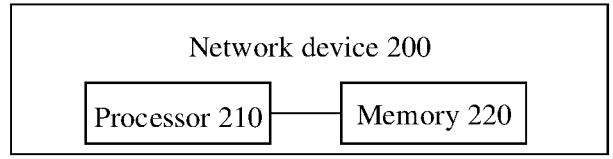
FIG. 24 shows a structural block diagram of a network device according to an embodiment of the present application.

In addition, as shown in FIG. 24, the network device 200 may include one or more of the following components: a processor 210, a memory 220, and one or more application programs, where one or more application programs may be stored in the memory 220 and configured to be executed by one or more processors 210, and one or more programs are configured to execute the method described in the foregoing method embodiment for configuring a control resource set.

In addition, for the specific implementation of the processor 210 and the memory 220, reference may be made to the aforementioned processor 110 and the memory 120.

Figure 25:
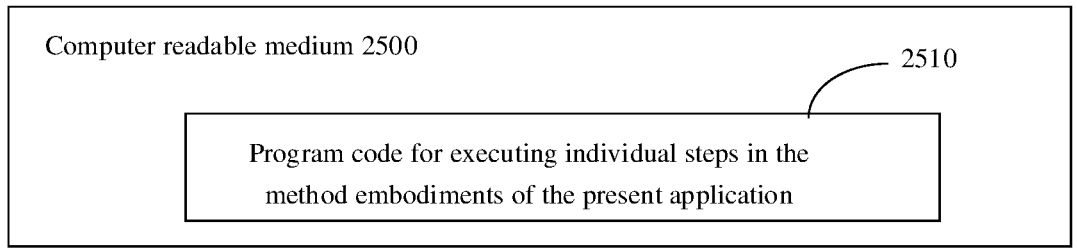
FIG. 25 shows a storage unit for storing or carrying the program code for implementing the method according to the embodiments of the present application according to an embodiment of the present application.

Referring to FIG. 25, which shows a structural block diagram of a computer-readable storage medium provided by an embodiment of the present application, the computer readable medium 2500 stores program code, and the program code may be invoked by a processor to execute the method described in the foregoing method embodiment. Specifically, the computer-readable storage medium may execute the above-mentioned method for configuring a control resource set or a method for determining a control resource set.

The computer-readable storage medium 2500 may be an electronic memory such as a flash memory, an Electrically Erasable Programmable Read Only Memory (EEPROM), an EPROM, a hard disk, or a ROM. Optionally, the computer-readable storage medium 2500 includes a non-transitory computer-readable storage medium. The computer-readable storage medium 2500 has a space for storing the program code 2510 that is used for executing any method step in the above-mentioned method. These program codes may be read from or written into one or more computer program products.

For example, the program codes 2510 may be compressed in an appropriate form.

Finally, it should be noted that the above embodiments are only used to illustrate the technical solutions of the present application, rather than limiting the technical solutions of the present application. Although the present application has been described in detail with reference to the foregoing embodiments, those of ordinary skill in the art should understand that the technical solutions recorded in the foregoing embodiments may be modified, or some of the technical features may be equivalently replaced; and such modifications or replacements do not make the essence of the corresponding technical solutions deviate from the spirit and scope of the technical solutions of the embodiments of the present application.

What is claimed is:

1. A method for determining a control resource set, applied to a user equipment of a communication system, wherein the communication system further comprises a network device, and the method comprises:
   acquiring configuration information of a control resource set corresponding to a bandwidth part (BWP) sent by the network device;
   determining first location information of the control resource set in a first sub-band according to the configuration information, wherein the first sub-band is at least one sub-band in a plurality of sub-bands in the BWP, and the first sub-band is a sub-band configured with the control resource set among the plurality of sub-bands in the BWP;
   determining second location information of the control resource set in a second sub-band according to the first location information, wherein the second sub-band is a sub-band in the plurality of sub-bands except the first sub-band, and the second sub-band is the sub-band in which no control resource set is pre-configured; and
   monitoring the control resource set at the second location information in the second sub-band.

2. The method according to claim 1, wherein determining the second location information of the control resource set in the second sub-band according to the first location information comprises:
   acquiring index information of the first sub-band; and
   determining the second location information of the control resource set in the second sub-band according to the index information of the first sub-band and the first location information, wherein a size of a frequency domain resource of the control resource set in the first sub-band is the same as a size of a frequency domain resource of the control resource set in the second sub-band.

3. The method according to claim 2, wherein the index information comprises at least one of a starting PRB location, a starting available PRB location, and a guard band ending PRB location.

4. The method according to claim 1, wherein before determining the second location information of the control resource set in the second sub-band according to the first location information, the method further comprises:
   determining the second sub-band from the plurality of sub-bands except the first sub-band.

5. The method according to claim 4, wherein determining the second sub-band from the plurality of sub-bands except the first sub-band comprises:
   determining all the sub-bands in the plurality of sub-bands except the first sub-band as candidate sub-bands;
   acquiring status information of each sub-band in the candidate sub-bands; and
   determining a sub-band whose status information meets a specified condition among the candidate sub-bands as the second sub-band.

6. The method according to claim 5, wherein acquiring the status information corresponding to each sub-band in the candidate sub-bands, and determining the sub-band whose status information meets the specified condition among the candidate sub-bands as the second sub-band, comprises:
   acquiring a bit group corresponding to the BWP, wherein the bit group comprises a plurality of bit values, each of the bit values corresponds to one of the candidate sub-bands, and each of the bit values corresponding to the sub-band is determined as the status information of the corresponding one of the candidate sub-bands; and
   determining the sub-band whose bit value is a specified value in the candidate sub-bands as the second sub-band.

7. The method according to claim 6, wherein the specified value is 1.

8. A method for configuring a control resource set, applied to a network device of a communication system, wherein the communication system further comprises a user equipment, and the method comprises:
   configuring a bandwidth part (BWP) and a plurality of sub-bands corresponding to the BWP for the user equipment;
   configuring a control resource set at first location information in a first sub-band of the BWP to acquire configuration information of the control resource set, wherein the first sub-band is at least one sub-band of the plurality of sub-bands in the BWP, and the first sub-band is a sub-band configured with the control resource set among the plurality of sub-bands in the BWP;
   determining second location information of the control resource set in a second sub-band according to the first location information, wherein the second sub-band is a sub-band in the plurality of sub-bands except the first sub-band, and the second sub-band is the sub-band in which no control resource set is pre-configured; and sending the configuration information of the control resource set to the user equipment, to instruct the user equipment to monitor the second sub-band according to the method according to claim 1.

9. The method according to claim 8, wherein determining the second location information of the control resource set in the second sub-band according to the first location information comprises:

acquiring index information of the first sub-band; and determining the second location information of the control resource set in the second sub-band according to the index information of the first sub-band and the first location information, wherein a size of a frequency domain resource of the control resource set in the first sub-band is the same as a size of a frequency domain resource of the control resource set in the second sub-band.

10. The method according to claim 8, wherein sending the configuration information of the control resource set to the user equipment comprises:

sending generated indication information and the configuration information of the control resource set to the user equipment, wherein the indication information is used to instruct the user equipment to determine the second sub-band from the plurality of sub-bands except the first sub-band.

11. The method according to claim 10, wherein sending the generated indication information and the configuration information of the control resource set to the user equipment comprises:

determining all the sub-bands in the plurality of sub-bands except the first sub-band as candidate sub-bands;

configuring status information for each sub-band in the candidate sub-bands; and sending the status information corresponding to each of the sub-bands to the user equipment as the indication information, wherein the indication information is used to instruct the user equipment to use a sub-band whose status information meets a specified condition as the second sub-band.

12. The method according to claim 11, wherein configuring the status information for each sub-band in the candidate sub-bands comprises:

setting a corresponding bit group for the BWP, wherein the bit group comprises a plurality of bit values, each of the bit values corresponds to one of the candidate sub-bands, each of the bit values corresponding to the sub-band is used as the status information of the corresponding one of the candidate sub-bands, and the indication information is used to instruct the user equipment to use the sub-band whose bit value is a specified value in the candidate sub-bands as the second sub-band.

13. A user equipment, applied to a communication system, wherein the communication system further comprises a network device, and the user equipment comprises:

one or more processors;

a memory; and one or more application programs, wherein the one or more application programs are stored in the memory and the one or more programs are configured to, when executed by the one or more processors, cause the user equipment to:

acquire configuration information of a control resource set corresponding to a bandwidth part (BWP) sent by the network device;

determine first location information of the control resource set in a first sub-band according to the configuration information, wherein the first sub-band is at least one sub-band in a plurality of sub-bands in the BWP, and the first sub-band is a sub-band configured with the control resource set among the plurality of sub-bands in the BWP;

determine second location information of the control resource set in a second sub-band according to the first location information, wherein the second sub-band is a sub-band in the plurality of sub-bands except the first sub-band, and the second sub-band is the sub-band in which no control resource set is pre-configured; and monitor the control resource set at the second location information in the second sub-band.

14. The user equipment according to claim 13, wherein the one or more programs are further configured to, when executed by the one or more processors, cause the user equipment to:

acquire index information of the first sub-band; and determine the second location information of the control resource set in the second sub-band according to the index information of the first sub-band and the first location information, wherein a size of a frequency domain resource of the control resource set in the first sub-band is the same as a size of a frequency domain resource of the control resource set in the second sub-band.

15. The user equipment according to claim 14, wherein the index information comprises at least one of a starting PRB location, a starting available PRB location, and a guard band ending PRB location.

16. The user equipment according to claim 13, wherein the one or more programs are further configured to, when executed by the one or more processors, cause the user equipment to:

determine the second sub-band from the plurality of sub-bands except the first sub-band.

17. The user equipment according to claim 16, wherein the one or more programs are further configured to, when executed by the one or more processors, cause the user equipment to:

determine all the sub-bands in the plurality of sub-bands except the first sub-band as candidate sub-bands;

acquire status information of each sub-band in the candidate sub-bands; and determine a sub-band whose status information meets a specified condition among the candidate sub-bands as the second sub-band.

18. The user equipment according to claim 17, wherein the one or more programs are further configured to, when executed by the one or more processors, cause the user equipment to:

acquire a bit group corresponding to the BWP, wherein the bit group comprises a plurality of bit values, each of the bit values corresponds to one of the candidate sub-bands, and each of the bit values corresponding to the sub-band is determined as the status information of the corresponding one of the candidate sub-bands; and determine the sub-band whose bit value is a specified value in the candidate sub-bands as the second sub-band.

19. A network device, applied to a communication system, wherein the communication system further comprises a user equipment, and the network device comprises:
one or more processors;
a memory; and
one or more application programs, wherein the one or more application programs are stored in the memory and the one or more programs are configured to, when executed by the one or more processors, cause the network device to:
configure a bandwidth part (BWP) and a plurality of sub-bands corresponding to the BWP for the user equipment;
configure a control resource set at first location information in a first sub-band of the BWP to acquire configuration information of the control resource set, wherein the first sub-band is at least one sub-band of the plurality of sub-bands in the BWP, and the first sub-band is a sub-band configured with the control resource set among the plurality of sub-bands in the BWP;
determine second location information of the control resource set in a second sub-band according to the first location information, wherein the second sub-band is a sub-band in the plurality of sub-bands except the first sub-band, and the second sub-band is the sub-band in which no control resource set is pre-configured; and
send the configuration information of the control resource set to the user equipment, to instruct the user equipment to monitor the second sub-band according to the method according to claim 8.

20. The network device according to claim 19, wherein the one or more programs are further configured to, when executed by the one or more processors, cause the network device to:
acquire index information of the first sub-band; and
determine the second location information of the control resource set in the second sub-band according to the index information of the first sub-band and the first location information, wherein a size of a frequency domain resource of the control resource set in the first sub-band is the same as a size of a frequency domain resource of the control resource set in the second sub-band.

21. The network device according to claim 20, wherein the index information comprises at least one of a starting PRB location, a starting available PRB location, and a guard band ending PRB location.

22. The network device according to claim 19, wherein the one or more programs are further configured to, when executed by the one or more processors, cause the network device to:
send generated indication information and the configuration information of the control resource set to the user equipment, wherein the indication information is used to instruct the user equipment to determine the second sub-band from the plurality of sub-bands except the first sub-band.

23. The network device according to claim 22, wherein the one or more programs are further configured to, when executed by the one or more processors, cause the network device to:
determine all the sub-bands in the plurality of sub-bands except the first sub-band as candidate sub-bands;
configure status information for each sub-band in the candidate sub-bands; and
send the status information corresponding to each of the sub-bands to the user equipment as the indication information, wherein the indication information is used to instruct the user equipment to use a sub-band whose status information meets a specified condition as the second sub-band.

24. The network device according to claim 23, wherein the one or more programs are further configured to, when executed by the one or more processors, cause the network device to:
set a corresponding bit group for the BWP, wherein the bit group comprises a plurality of bit values, each of the bit values corresponds to one of the candidate sub-bands, each of the bit values corresponding to the sub-band is used as the status information of the corresponding one of the candidate sub-bands, and the indication information is used to instruct the user equipment to use5 the sub-band whose bit value is a specified value in the candidate sub-bands as the second sub-band.

25. The network device according to claim 24, wherein the specified value is 1.

\* \* \* \* \*